US012615081B2

(12) United States Patent (10) Patent No.: US 12,615,081 B2
Border (45) Date of Patent: Apr. 28, 2026

(54) ASYNCHRONOUS SCRAMBLED CODED MULTIPLE ACCESS (ASCMA) BASED INROUTE TRANSMISSION

(71) Applicant: Hughes Network Systems, LLC, Germantown, MD (US)

(72) Inventor: John Leonard Border, Middletown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 947 days.

(21) Appl. No.: 17/742,282

(22) Filed: May 11, 2022

(65) Prior Publication Data

US 2023/0370159 A1 Nov. 16, 2023

(51) Int. Cl.
| | |
|---|---|
| *H04B 7/185* | (2006.01) |
| *H04B 7/204* | (2006.01) |
| *H04W 28/02* | (2009.01) |
| *H04W 72/04* | (2023.01) |

(52) U.S. Cl.
CPC ..... *H04B 7/18519* (2013.01); *H04B 7/18513* (2013.01); *H04W 28/0289* (2013.01); *H04W 72/04* (2013.01); *H04B 7/204* (2013.01)

(58) Field of Classification Search
CPC ............ H04B 7/18519; H04B 7/18513; H04B 7/204; H04W 28/0289; H04W 72/04
See application file for complete search history.

(56) References Cited

U.S. PATENT DOCUMENTS

| | | | |
|---|---|---|---|
| 9,894,687 B2 | 2/2018 | Becker et al. | |
| 2011/0026546 A1* | 2/2011 | Zubow ................. | H04L 5/0037 370/480 |

| | | | |
|---|---|---|---|
| 2017/0302500 A1* | 10/2017 | Lu ........................... | H04B 7/024 |
| 2019/0273590 A1 | 9/2019 | Becker | |
| 2019/0356604 A1* | 11/2019 | Xu ......................... | H04L 5/0044 |
| 2020/0029265 A1* | 1/2020 | Choquette .......... | H04B 7/18528 |
| 2020/0044762 A1 | 2/2020 | Lee et al. | |
| 2021/0044371 A1* | 2/2021 | Chen ................... | H04J 13/0003 |
| 2023/0344733 A1* | 10/2023 | Tourrilhes ............ | H04Q 3/0091 |

OTHER PUBLICATIONS

International Search Report and Written Opinion for Application No. PCT/US2023/018158, mailed Jun. 29, 2023, 15 pages.
R. I. Seshadri et al., "Asynchronous Scrambled Coded Multiple Access for 5G Non-Orthogonal Multiple Access: System Level Performance," 2020 IEEE 91st Vehicular Technology Conference (VTC2020-Spring), Antwerp, Belgium, 2020, pp. 1-7, doi: 10.1109/VTC2020-Spring48590.2020.9128505.
Canadian Office Action, CA App. No. 3252639, dated Dec. 22, 2025, 3 pages.

* cited by examiner

*Primary Examiner* — Oussama Roudani
(74) *Attorney, Agent, or Firm* — Mannava & Kang, P.C.

(57) ABSTRACT

Systems and methods for facilitating an inroute transmission of data are disclosed. A system may include a processor and a memory storing instructions, which when executed by the processor, may cause the processor to receive information pertaining to a bandwidth capacity of a communication channel for an inroute transmission of data from a terminal of a plurality of terminals. The processor may determine, based on the received information and using an asynchronous scrambled coded multiple access (ASCMA) technique, a bandwidth allocation for the inroute transmission of data. The inroute to transmission may be in a form of ASCMA transmission of one or more encapsulated group burst packets.

19 Claims, 20 Drawing Sheets

GB SPACING (SYMBOLS): 7742

| $TO_{i,j}$ | | $TAW_j$ | | | | TO DEFINITION | | |
| --- | --- | --- | --- | --- | --- | --- | --- | --- |
| | | 0 | 30645 | 56985 | | | | |
| | | CUMULATIVE GAP | | | WINDOW END | TO LOCATION | DELTA | MAX GB BURSTS |
| $TO_i$ | i | j=0 | j=1 | j=2 | | | | |
| 5455 | 0 | 5455 | 36100 | 62440 | 18689 | 5455 | 13234 | 2 |
| 11317 | 1 | 11317 | 41962 | 68302 | 18689 | 11317 | 7372 | 1 |
| 17179 | 2 | 17179 | 47824 | 74164 | 18689 | 17179 | 1510 | 1 |
| 23041 | 3 | 23041 | 53686 | 80026 | 61884 | 53686 | 8198 | 2 |
| 28903 | 4 | 28903 | 59548 | 85888 | 61884 | 59548 | 2336 | 1 |
| 34765 | 5 | 34765 | 65410 | 91750 | 138159 | 91750 | 46409 | 6 |

| $TO_{i,j}$ | | | | $TAW_i$ | | GB SPACING (SYMBOLS): | | 7742 | |
| | | | | CUMULATIVE GAP | | | TO DEFINITION | | |
| | | | | 0 | | | | | |
| | | | | j | WINDOW END | TO LOCATION | DELTA | MAX GB BURSTS | |
| | i | | | 0 | | | | | |
| $TO_i$ | | | | | | | | | |
| 5455 | 0 | | | 5455 | 184319 | 5455 | 178864 | 24 | |
| 20815 | 1 | | | 20815 | 184319 | 20815 | 163504 | 22 | |
| 36175 | 2 | | | 36175 | 184319 | 36175 | 148144 | 20 | |
| 51135 | 3 | | | 23041 | 184319 | 51135 | 133184 | 18 | |
| 66895 | 4 | | | 66895 | 184319 | 66895 | 117424 | 16 | |
| 82225 | 5 | | | 82225 | 184319 | 82225 | 102094 | 14 | |

INROUTE SYMBOL RATE (KSPS): 2048    SYMBOLS PER FRAME: 92160    SYMBOLS PER ZONE: 1440

| ZONE NUMBER | SYMBOL START | SYMBOL END | ZONE NUMBER | SYMBOL START | SYMBOL END | ZONE NUMBER | SYMBOL START | SYMBOL END | ZONE NUMBER | SYMBOL START | SYMBOL END |
|---|---|---|---|---|---|---|---|---|---|---|---|
| 0 | 0 | 1439 | 16 | 23040 | 24479 | 32 | 46080 | 47519 | 48 | 69120 | 70559 |
| 1 | 1440 | 2879 | 17 | 24480 | 25919 | 33 | 47520 | 48959 | 49 | 70560 | 71999 |
| 2 | 2880 | 4319 | 18 | 25920 | 27359 | 34 | 48960 | 50399 | 50 | 72000 | 73439 |
| 3 | 4320 | 5759 | 19 | 27360 | 28799 | 35 | 50400 | 51839 | 51 | 73440 | 74879 |
| 4 | 5760 | 7199 | 20 | 28800 | 30239 | 36 | 51840 | 53279 | 52 | 74880 | 76319 |
| 5 | 7200 | 8639 | 21 | 30240 | 31679 | 37 | 53280 | 54719 | 53 | 76320 | 77759 |
| 6 | 8640 | 10079 | 22 | 31680 | 33119 | 38 | 54720 | 56159 | 54 | 77760 | 79199 |
| 7 | 10080 | 11519 | 23 | 33120 | 34559 | 39 | 56160 | 57599 | 55 | 79200 | 80639 |
| 8 | 11520 | 12959 | 24 | 34560 | 35999 | 40 | 57600 | 59039 | 56 | 80640 | 82079 |
| 9 | 12960 | 14399 | 25 | 36000 | 37439 | 41 | 59040 | 60479 | 57 | 82080 | 83519 |
| 10 | 14400 | 15839 | 26 | 37440 | 38879 | 42 | 60480 | 61919 | 58 | 83520 | 84959 |
| 11 | 15840 | 17279 | 27 | 38880 | 40319 | 43 | 61920 | 63359 | 59 | 84960 | 86399 |
| 12 | 17280 | 18719 | 28 | 40320 | 41759 | 44 | 63360 | 64799 | 60 | 86400 | 87839 |
| 13 | 18720 | 20159 | 29 | 41760 | 43199 | 45 | 64800 | 66239 | 61 | 87840 | 89279 |
| 14 | 20160 | 21599 | 30 | 43200 | 44639 | 46 | 66240 | 67679 | 62 | 89280 | 90719 |
| 15 | 21600 | 23039 | 31 | 44640 | 46079 | 47 | 67680 | 69119 | 63 | 90720 | 92159 |

*FIG. 13A*

| INROUTE SYMBOL RATE (KSPS): | 4096 | | SYMBOLS PER FRAME: | 184320 | | SYMBOLS PER ZONE: | 2880 | |
|---|---|---|---|---|---|---|---|---|
| ZONE NUMBER | SYMBOL | | ZONE NUMBER | SYMBOL | | ZONE NUMBER | SYMBOL | |
| | START | END | | START | END | | START | END |
| 0 | 0 | 2879 | 16 | 46080 | 48959 | 32 | 92160 | 95039 |
| 1 | 2880 | 5759 | 17 | 48960 | 51839 | 33 | 95040 | 97919 |
| 2 | 5760 | 8639 | 18 | 51840 | 54719 | 34 | 97920 | 100799 |
| 3 | 8640 | 11519 | 19 | 54720 | 57599 | 35 | 100800 | 103679 |
| 4 | 11520 | 14399 | 20 | 57600 | 60479 | 36 | 103680 | 106559 |
| 5 | 14400 | 17279 | 21 | 60480 | 63359 | 37 | 106560 | 109439 |
| 6 | 17280 | 20159 | 22 | 63360 | 66239 | 38 | 109440 | 112319 |
| 7 | 20160 | 23039 | 23 | 66240 | 69119 | 39 | 112320 | 115199 |
| 8 | 23040 | 25919 | 24 | 69120 | 71999 | 40 | 115200 | 118079 |
| 9 | 25920 | 28799 | 25 | 72000 | 74879 | 41 | 118080 | 120959 |
| 10 | 28800 | 31679 | 26 | 74880 | 77759 | 42 | 120960 | 123839 |
| 11 | 31680 | 34559 | 27 | 77760 | 80639 | 43 | 123840 | 126719 |
| 12 | 34560 | 37439 | 28 | 80640 | 83519 | 44 | 126720 | 129599 |
| 13 | 37440 | 40319 | 29 | 83520 | 86399 | 45 | 129600 | 132479 |
| 14 | 40320 | 43199 | 30 | 86400 | 89279 | 46 | 132480 | 135359 |
| 15 | 43200 | 46079 | 31 | 89280 | 92159 | 47 | 135360 | 138239 |

| SYMBOLS PER ZONE: | 2880 | |
|---|---|---|
| ZONE NUMBER | SYMBOL | |
| | START | END |
| 48 | 138240 | 141119 |
| 49 | 141120 | 143999 |
| 50 | 144000 | 146879 |
| 51 | 146880 | 149759 |
| 52 | 149760 | 152639 |
| 53 | 152640 | 155519 |
| 54 | 155520 | 158399 |
| 55 | 158400 | 161279 |
| 56 | 161280 | 164159 |
| 57 | 164160 | 167039 |
| 58 | 167040 | 169919 |
| 59 | 169920 | 172799 |
| 60 | 172800 | 175679 |
| 61 | 175680 | 178559 |
| 62 | 178560 | 181439 |
| 63 | 181440 | 184319 |

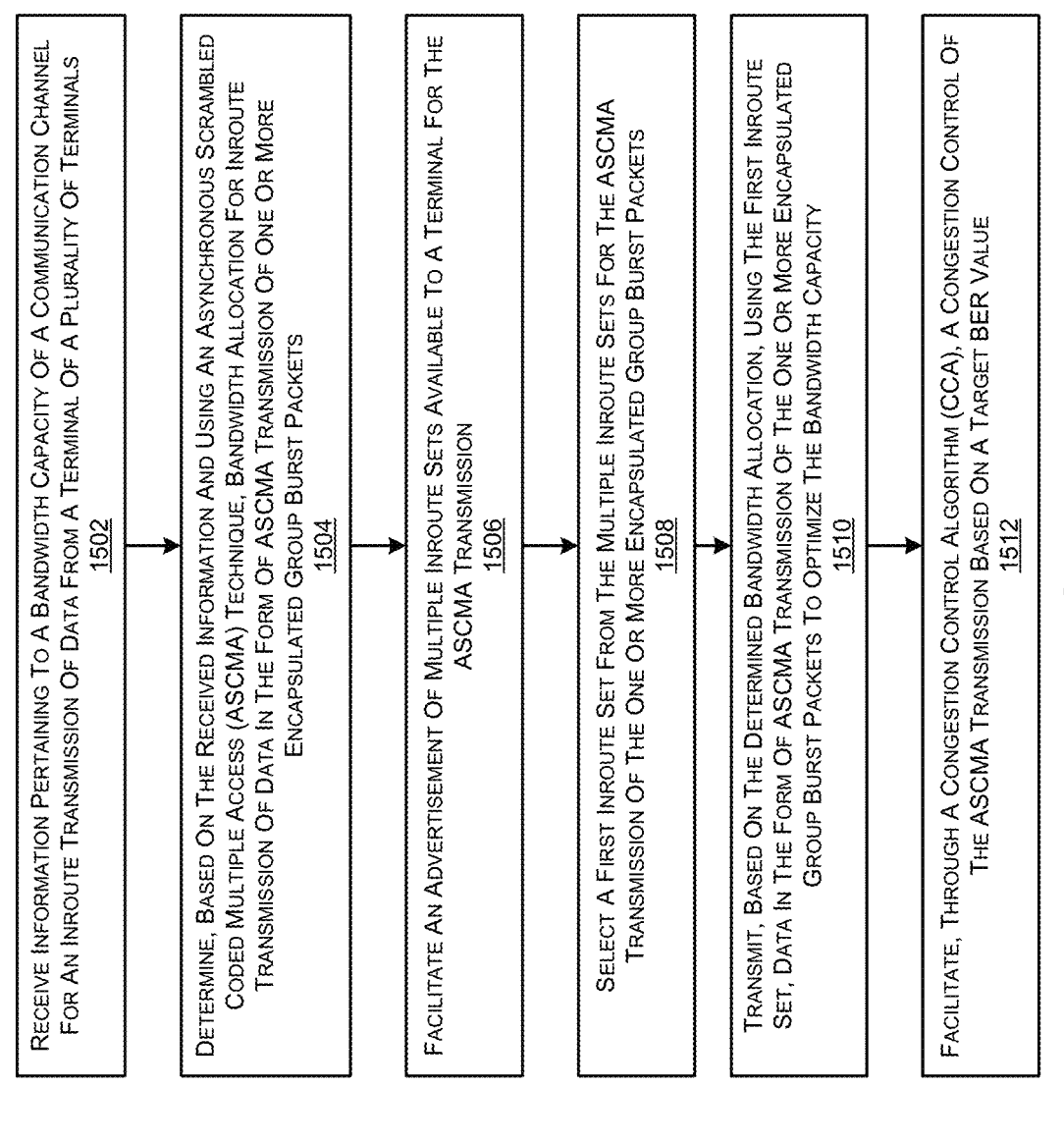

RECEIVE INFORMATION PERTAINING TO A BANDWIDTH CAPACITY OF A COMMUNICATION CHANNEL FOR AN INROUTE TRANSMISSION OF DATA FROM A TERMINAL OF A PLURALITY OF TERMINALS
1502

DETERMINE, BASED ON THE RECEIVED INFORMATION AND USING AN ASYNCHRONOUS SCRAMBLED CODED MULTIPLE ACCESS (ASCMA) TECHNIQUE, BANDWIDTH ALLOCATION FOR INROUTE TRANSMISSION OF DATA IN THE FORM OF ASCMA TRANSMISSION OF ONE OR MORE ENCAPSULATED GROUP BURST PACKETS
1504

FACILITATE AN ADVERTISEMENT OF MULTIPLE INROUTE SETS AVAILABLE TO A TERMINAL FOR THE ASCMA TRANSMISSION
1506

SELECT A FIRST INROUTE SET FROM THE MULTIPLE INROUTE SETS FOR THE ASCMA TRANSMISSION OF THE ONE OR MORE ENCAPSULATED GROUP BURST PACKETS
1508

TRANSMIT, BASED ON THE DETERMINED BANDWIDTH ALLOCATION, USING THE FIRST INROUTE SET, DATA IN THE FORM OF ASCMA TRANSMISSION OF THE ONE OR MORE ENCAPSULATED GROUP BURST PACKETS TO OPTIMIZE THE BANDWIDTH CAPACITY
1510

FACILITATE, THROUGH A CONGESTION CONTROL ALGORITHM (CCA), A CONGESTION CONTROL OF THE ASCMA TRANSMISSION BASED ON A TARGET BER VALUE
1512

SYSTEM MEMORY
1618

PROCESSOR
1612

STORAGE ADAPTOR
1620

NETWORK INTERFACE
1616

MULTIMEDIA ADAPTER
1614

ASYNCHRONOUS SCRAMBLED CODED MULTIPLE ACCESS (ASCMA) BASED INROUTE TRANSMISSION

TECHNICAL FIELD

This patent application is directed to satellite communication systems and, more specifically, to systems and methods for facilitating inroute transmission in satellite systems.

BACKGROUND

In satellite systems, multiple terminals (user terminal) located in a service area may transmit data to a satellite or corresponding gateway. This transmission of the data by the terminals may be termed as inroute transmission. Because multiple terminals may try to transmit data at the same time, the resultant traffic at an inroute transmission channel may need to be managed to avoid congestion or ineffective transmission. One known technique for facilitating the inroute transmission may include scrambled coded multiple access (SCMA) technique. This technique allows transmission of data in form of encoded group bursts. The SCMA technique may utilize a cancellation procedure to support simultaneous transmission of similar frequencies from the multiple terminals. However, in case of a particular transmission, for example, expedited data, which may require minimum latency, the SCMA technique may require apertures for transmission. The apertures may allow transmission based on time slot scheduling. This may not only increase overhead of transmission and associated costs but may also limit flexibility of operations and may not enable to achieve desired reduction in latency.

Furthermore, SCMA transmission may not be able to span across frame boundaries. This may reduce the ability to transmit maximum group bursts as well as may increase overhead as the SCMA group bursts may not be divided evenly into a frame. Furthermore, SCMA transmissions may include a small limit on the number of terminals which can transmit at the same time. Thus, the known techniques may include limitations that may fail to provide an effective inroute transmission from multiple terminals, thus resulting in congested traffic and/or ineffective transmission of data.

SUMMARY

The present disclosure pertains to a system including a processor and a memory storing instructions which, when executed by the processor, cause the processor to receive information pertaining to bandwidth capacity of a communication channel for inroute transmission of data from a terminal of a plurality of terminals. The processor may further be caused to determine, based on the received information and using an asynchronous scrambled coded multiple access (ASCMA) technique, bandwidth allocation for inroute transmission of data in the form of ASCMA transmission of one or more encapsulated group burst packets. Based on the determined bandwidth allocation, the processor may further be caused to transmit data in the form of ASCMA transmission of the one or more encapsulated group burst packets to optimize the bandwidth capacity.

The present disclosure is also directed to a method for facilitating inroute transmission of data. The method includes receiving, by a processor, information pertaining to a bandwidth capacity of a communication channel for an inroute transmission of data from a terminal of a plurality of terminals. The method also includes determining, by the processor, based on the received information and using an asynchronous scrambled coded multiple access (ASCMA) technique, bandwidth allocation for inroute transmission of data in the form of ASCMA transmission of one or more encapsulated group burst packets. The method also include transmitting, based on the determined bandwidth allocation, data in the form of ASCMA transmission of the one or more encapsulated group burst packets to optimize the bandwidth capacity.

The present disclosure is also directed to a non-transitory computer-readable storage medium having an executable stored thereon, which, when executed, instructs a processor to receive information pertaining to a bandwidth capacity of a communication channel for an inroute transmission of data from a terminal of a plurality of terminals, determine based on the received information and using an asynchronous scrambled coded multiple access (ASCMA) technique, a bandwidth allocation for inroute transmission of data in the form of ASCMA transmission of one or more encapsulated group burst packets, and transmit, based on the determined bandwidth allocation, data in the form of ASCMA transmission of the one or more encapsulated group burst packets to optimize the bandwidth capacity.

BRIEF DESCRIPTION OF DRAWINGS

Features of the systems and methods are illustrated by way of example and not limited in the following Figure(s), in which like numerals indicate like elements, in which:

FIG. 7 illustrates a tabular data showing mapping of transmit opportunities (TOs) to each Transmission Allowed Windows (TAWs) of FIG. 6B, according to an example;

FIG. 9 illustrates a tabular data showing mapping of transmit opportunities (TOs) to each Transmission Allowed Windows (TAWs) of FIG. 8B, according to an example;

FIGS. 13A-13B illustrate examples for listing zone definitions, according to an example;

FIG. 15 illustrates a method for facilitating inroute transmission of data, according to an example.

DETAILED DESCRIPTION

For simplicity and illustrative purposes, the present systems and methods may be described by referring mainly to examples and embodiments thereof. In the following description, numerous specific details may be set forth in order to provide a thorough understanding of the systems and methods described herein. It will be readily apparent, however, that the systems and methods may be practiced without limitation to these specific details. In other instances, some methods and structures readily understood by one of ordinary skill in the art have not been described in detail so as not to unnecessarily obscure the systems and methods described herein. As used herein, the terms "a" and "an" may be intended to denote at least one of a particular element, the term "includes" means includes but not limited to, the term "including" means including but not limited to, and the term "based on" means based at least in part on.

As described above, known techniques for inroute transmission may implement scrambled coded multiple access (SCMA) technique. In case of transmission of expedited data pertaining to interactive traffic that may need minimum latency, the SCMA technique may require apertures for transmission, which may add to overhead. SCMA transmissions may not be able to span across frame boundaries, which may reduce ability to transmit maximum group burst as well as may increase the overhead, as SCMA bursts may not be divided evenly into a frame. Furthermore, SCMA transmissions may include a small limit on the number of terminals which can transmit at the same time.

The systems and methods described herein, thus provides an effective approach to overcome the mentioned limitations. The systems and methods described herein, may be based on an asynchronous scrambled coded multiple access (ASCMA) technique. This may facilitate the inroute transmission in the form of ASCMA transmission of one or more encapsulated group burst packets (ASCMA group burst packets) for an effective bandwidth allocation. The ASCMA technique may not require the use of apertures and thus there may be no aperture overhead. Further, the ASCMA technique may be able to operate across Time-division multiple access (TDMA) frame boundaries. Therefore, entire bandwidth can be used and group bursts may not need to be truncated due to frame boundaries. Further, ASCMA supports approximately three times as many terminals transmitting at the same time in comparison to SCMA. This makes the throughput of an ASCMA inroute transmission to be on par with the throughput of a TDMA inroute despite using a rate of coding, for example, 1/9 coding. Furthermore, ASCMA facilitates to improve latency reduction for expedited interactive traffic by allowing a terminal to transmit immediately when such traffic arrives. The terminal may not need to wait till the next scheduled transmit aperture. Several other advantages may be realized.

Figure 1:
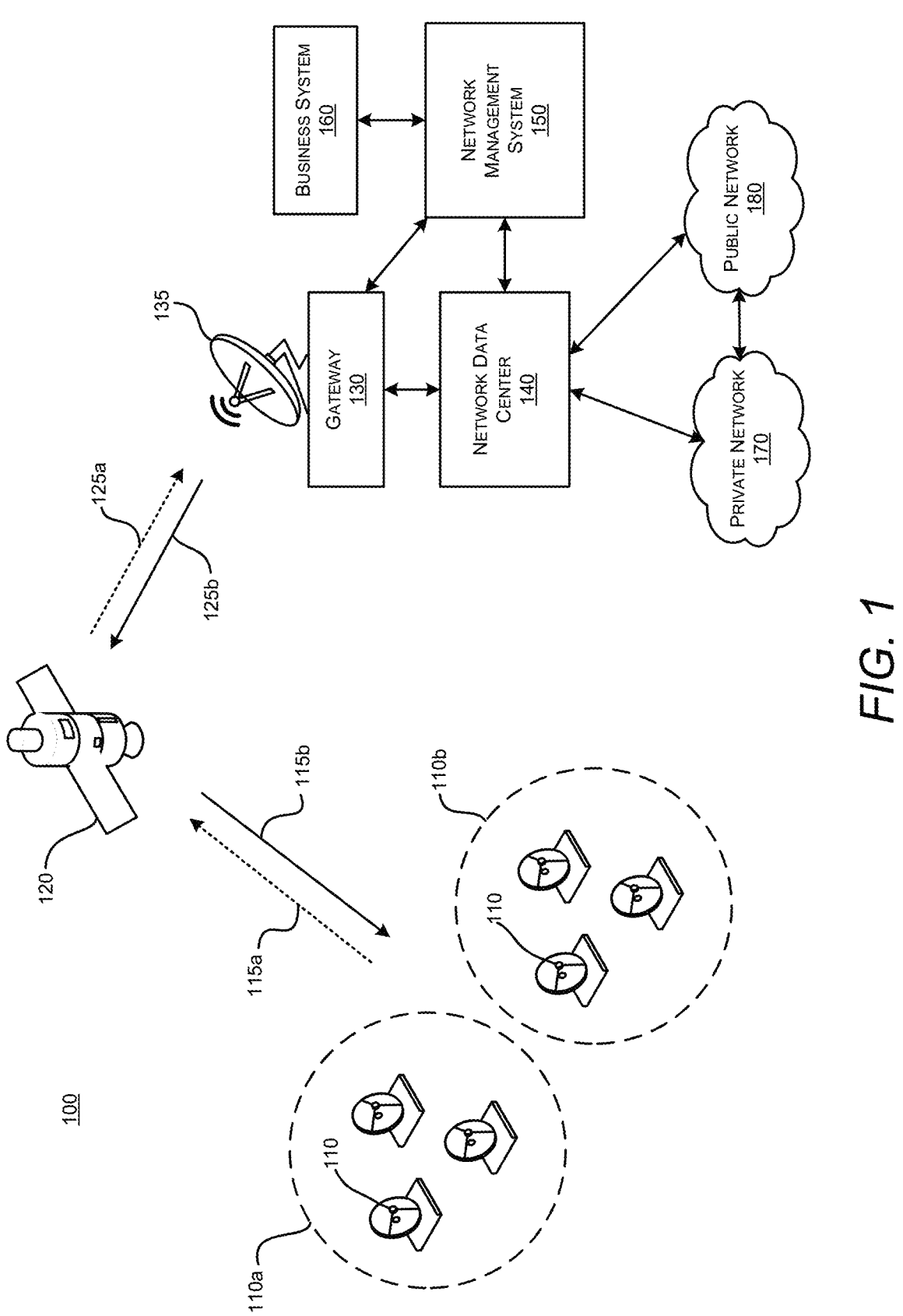
FIG. 1 illustrates a system for facilitating inroute transmission of data, according to an example.

FIG. 1 illustrates a system for facilitating inroute transmission of data, according to an example. In some examples, the system 100 may pertain to a satellite communication system including a satellite 120 that may use one or more beams to provide service over an extended geographic area to at least one terminal 110 (hereinafter also interchangeably referred to as user terminal 110 or UT 110) of a plurality of terminals 110. The satellite communication system may be capable of providing at least voice and/or data services. In some examples, the inroute transmission may include transmission of data from the terminals 110 to the satellite 120 (inroute uplink 115a) and/or transmission of data from the satellite 120 to a gateway 130 (inroute downlink 125a). The satellite 120 may relay signal to the at least one terminal 110 from the gateway 130 via channels 125b and 115b respectively.

In some examples, the systems and methods described herein may be applicable to non-geostationary (NGSO) satellites, although it should be appreciated that the examples herein may not be limited only to NGSO constellations. In some examples, the system 100 may include any number of terminals 110, satellite 120, gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The terminals 110 may be any variety of terminals. For example, the terminals 110 may be customer terminals, such as very small aperture terminals (VSATs). It should be appreciated that VSATs may be terminals that may be mounted on a structure, habitat, or other object or location. Depending on application, the user terminals 110 may include or incorporate any number of antenna dishes, which may be provided in various sizes, depths, or dimensions (e.g., small, medium, large, etc.).

Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, and other such vehicles. It should be appreciated that such terminals 110 may generally be operational when still and not while being transported. That said, there might be scenarios where the terminals 110 may be transportable (mobile) terminals that remain operational during transit. As used herein, the terms "terminal," "customer terminal," "satellite terminal," and/or "VSAT" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, and other such devices. In general, the customer premise equipment (CPE) may include, without limitation, any number of network-enabled computing devices, elements, or systems. It should be appreciated that a network of such devices may be commonly referred to as the "Internet of Things" (IoT).

As shown in FIG. 1, there may be different types of terminals or a plurality of groups of terminals 110 (e.g., customer VSATs). For example, each terminal such as 110A, 110B (collectively referred to as terminal or terminals or plurality of terminals 110) may pertain to an individual terminal or plurality of groups. In some examples, the terminal 110A may be terminal(s) located in a similar geographic location than the terminal(s) 110B.

The satellite 120 may be an object intentionally placed into orbit. In some examples, the satellite 120 may be an artificial satellite that may be configured to transmit and receive data signals. For example, the satellite 120 may form the one or more radio beams and provide connectivity between at least the terminals 110 and the gateway 130. More specifically, the satellite 120 may communicate data signals using these beams with the terminals 110 and with the gateway 130. It should be appreciated that the satellite 120 may form any number of beams to communicate data signals with any number of components, in same or different orbital plane. In some examples, the satellite 120 may be a NGSO communication satellite. The satellite 120 may be in geosynchronous (GEO) orbit, low earth orbit (LEO) or mid earth orbit (MEO) satellite. The link conditions may vary more rapidly for LEO and MEO systems as the propagation path may be longer or shorter depending on the satellite location and different atmospheric/weather conditions encountered. In some examples, the satellite 120 may include, but not limited to, a transponder satellite, a regenerative satellite, and/or other similar satellites.

The gateway 130 may include or be communicatively coupled to a transceiver 135, such as a radio frequency transceiver (RFT). The transceiver 135 may include an antenna unit of any type (e.g., transmitter, receiver, communication element, etc.) which may transmit and receive signals. In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150.

The gateway 130 may be further configured to route traffic to and from the public internet 180 and/or private network 170 across the satellite communication channels 115a, 115b, 125a, 125b to any terminal 110, which would then provide data communications or route traffic to any customer premise equipment (CPE) (not shown) associated with the terminal 110. Although depicted as a single element, the gateway 130 may include a single gateway, multiple gateways residing locally or remotely, in full or in part, relative to the other system components. As described in more detail below, the gateway 130, the network data center 140, and/or the network management systems (NMS) 150 may provide operations pertaining to the inroute transmission.

The system may include a processor (e.g., a computer processing unit (CPU), etc.), a data store and other such elements. In some examples, the system may be implemented in the gateway 130. The processor may include also various configurations including, without limitations, a personal computer, laptop, server, and other elements. The data store may be used, for example, to store and provide access to information pertaining to various operations of and in the system 100. Although depicted as a single element, the processor and/or the data store may be configured as a single element, multiple elements, or an array of elements. For example, the gateway 130 may include any number of processors and/or data stores in order to accommodate the needs of a particular system implementation. Various examples may further provide for redundant paths for components of the gateway 130. These redundant paths may be associated with backup components capable of being seamlessly or quickly switched in the event of a failure or critical fault of any primary component.

In some examples, the systems and methods described herein, may facilitate an efficient inroute transmission of data. The system may include a memory storing instructions, which when executed by the processor (or processors), cause the processor to perform one or more functions. The processor may receive information pertaining to a bandwidth capacity of a communication channel for an inroute transmission of data from a terminal of a plurality of terminals. The processor may determine, based on the bandwidth capacity and using an asynchronous scrambled coded multiple access (ASCMA) technique, a bandwidth allocation to be applied for facilitating the inroute transmission of data. The inroute transmission may be in a form of ASCMA transmission of one or more encapsulated group burst packets that may be transmitted without time based scheduling to optimize the bandwidth capacity.

In an embodiment, the encapsulated group burst packets pertain to encoded transmission of information in the form of multiple packets. In some embodiments, each packet may pertain to a group burst having a specific burst size. In some embodiments, a pre-defined spacing may be included between multiple group burst packets. The processor(s) may determine at least one of the burst size or the pre-defined spacing to prevent a collision between packets pertaining to two separate groups. In some examples, the system/processor(s) may be configured in the gateway 130 and/or the terminals 110 to perform the required operations. For example, terminal may include a processor and gateway may include another processor that may process the information to determine the bandwidth capacity based on congestion control calculations.

Referring to FIG. 1, the network data center 140 may be communicatively coupled to the gateway 130, as well as other system components, such as the network management system (NMS) 150, private network 170, and/or public network 180. In some examples, the network data center 140 may be a satellite network data center. In some examples, the network data center 140 may be include a plurality of network data centers that may be local or remote, in full or in part, relative to the other system components.

The network management system (NMS) 150, may maintain, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be single or a plurality distributed components that may be communicatively coupled to each other and/or with other system elements, such as the gateway 130 (e.g., using the previously described hardware and external networks). The network management system (NMS) 150 may, among other things, include a configuration manager or other similar management unit.

The business system 160, or other various system elements or components, may also be communicatively coupled to the network management system (NMS) 150 and/or gateway 130. In some examples, the business system 160 may include a virtual network operator (VNO) which may be configured to communicate with the gateway 130 and/or the network management system (NMS) 150. More particularly, a virtual network operator (VNO), in some scenarios, may be a business or government entity, that may have access (by purchase or license) to a managed service and associated capacity from a satellite network operator in order to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100 as well as any external element or system connected to the private network 170 and/or public network 180.

The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they may be communicatively coupled. The private network 170 and/or public network 180 may facilitate transmission of data according to a transmission protocol of any of the devices and/or systems in the private network 170 and/or public network 180. Although each of the private network 170 and/or public network 180 may be depicted as a single network in FIG. 1, it should be appreciated that in some examples, each of the private network 170 and/or public network 180 may include a plurality of interconnected networks as well.

While the processors, components, elements, systems, subsystems, and/or other computing devices may be shown as single components or elements, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100 and their components, as shown in FIG. 1.

In some embodiments, the ASCMA technique may enable to avoid a need for aperture or time-slot based inroute transmission that may be required otherwise in case of SCMA or TDMA transmissions. For example, in case of TDMA or SCMA, a location of the apertures may be required to be advertised to the terminals as a "time plan". Thus, SCMA bursts may need to be transmitted in specific time slots in order to be successfully received at the gateway, which may limit SCMA to the same frame timing as that of TDMA. However, ASCMA may allow a burst to be sent at any time and does not require the opening of any apertures. It may be appreciated that even though ASCMA transmission may be separate/independent from TDMA timing, however, in some examples, the TDMA timing may be used as a frame of reference for scheduling bursts and acknowledging bursts.

Furthermore, as ASCMA transmission may be independent from TDMA timing, there may be no frame or superframe boundaries to work around for ASCMA transmission. However, the ASCMA transmission window may be used considering the existing TDMA allocations. Furthermore, the asynchronous nature of ASCMA transmission may enable to support three times of overlapping bursts at the same time as compared to SCMA, thus tripling the effective capacity of the inroute transmission.

In some examples, the ASCMA technique may utilize Quadrature Phase Shift Keying (QPSK) modulation. For this reason, the ASCMA implementation may require the use of a linear radio. In some examples, the ASCMA may use 1/9 code rate (similar to SCMA). The ASCMA may be capable for supporting 2048 ksps inroutes initially with added support for 4096 ksps planned.

In some examples, the processor may facilitate advertisement of multiple inroute sets available to the plurality of terminals for the ASCMA transmission. In this case, multiple ASCMA inroutes may be advertised together to the plurality of terminals as an inroute group. Since there may be no apertures used with ASCMA, the technique may not involve a burst time plan but may include a group burst spacing field. In some examples, the group burst packets may include a pre-defined spacing there between. In an example, the processor may determine at least one of the burst size or the pre-defined spacing to prevent a collision between packets pertaining to two separate groups.

In an example, to determine the bandwidth allocation, the processor may select a first inroute set from the multiple inroute sets for the ASCMA transmission of the plurality of encapsulated group burst packets (also interchangeably referred to as ASCMA group bursts). The inroute set may be selected based on a weighted random selection of the first inroute set depending on corresponding load condition and availability of the selected inroute set at the time of selection. In an example, the terminal may select an inroute set to transmit when it needs to use ASCMA, provided ASCMA transmission may be supported by the inroute set. In some examples, the terminal may execute an inroute set selection algorithm for selection of the inroute set.

In some examples, the terminal may select a same or a different ASCMA inroute each time it selects an inroute set. The initial selection of a first inroute set (ASCMA inroute) in an inroute set may pertain to a weighted random selection from among all of the ASCMA inroutes in the ASCMA inroute group of the inroute set. Upon selection of the first inroute set (ASCMA inroute), the terminal may continue to track current load conditions of the first inroute set. In some examples, the terminal may change its selected first inroute set if the selected inroute set reaches a configured level of congestion and based on availability of other ASCMA inroutes in the inroute set which may be less congested.

In an example, the processor may facilitate monitoring of the multiple inroute sets at pre-defined time intervals. In this case, another inroute can be selected if the earlier selected inroute may be congested. In an example, based on the monitoring and a configurable parameter, a second inroute set may be selected from the multiple inroute sets such that the second inroute set may be less congested than the first inroute set. In some examples, the configurable parameter may pertain to a time period related to the pre-defined time intervals. For example, the time period may be a default time period of 5 seconds, though the time period may not be limited by this example.

In other examples, the configurable parameter may pertain to availability or operating probability of a new inroute that may lead to lesser congestion. For example, the configurable parameter may be N that may relate to the criterion for reselecting, such as, for example, another ASCMA inroute having an operating probability which may be more than N % better than the currently selected inroute. For example, the value of N can be set at 20%. In some examples, if reselection may be warranted, a new weighted inroute selection may be performed. For example, for reselection, the inroute sets may be limited to the current inroute in addition to other inroutes that meet the criteria set as per the configurable parameter. In some examples, the reselection process may exclude an inroute set that may be already be known to be more congested than the currently selected inroute set.

In an example, the processor may facilitate the bandwidth allocation to be applied for enabling the inroute transmission of data in the form of ASCMA transmission. The ASCMA transmission may be in form of one or more encapsulated group burst packets that may be transmitted without time based scheduling to optimize the bandwidth capacity. In some examples, each packet in the plurality of encapsulated group burst packets may include a corresponding header and a unique word identifier. The unique word identifier may be a unique word that may be randomly selected by the terminal. For example, the unique word may include a single set of a 512-symbol based unique word. The unique word identifier (or the unique word) may enable identification of the encapsulated group burst packets pertaining to a common group.

Figure 2A:
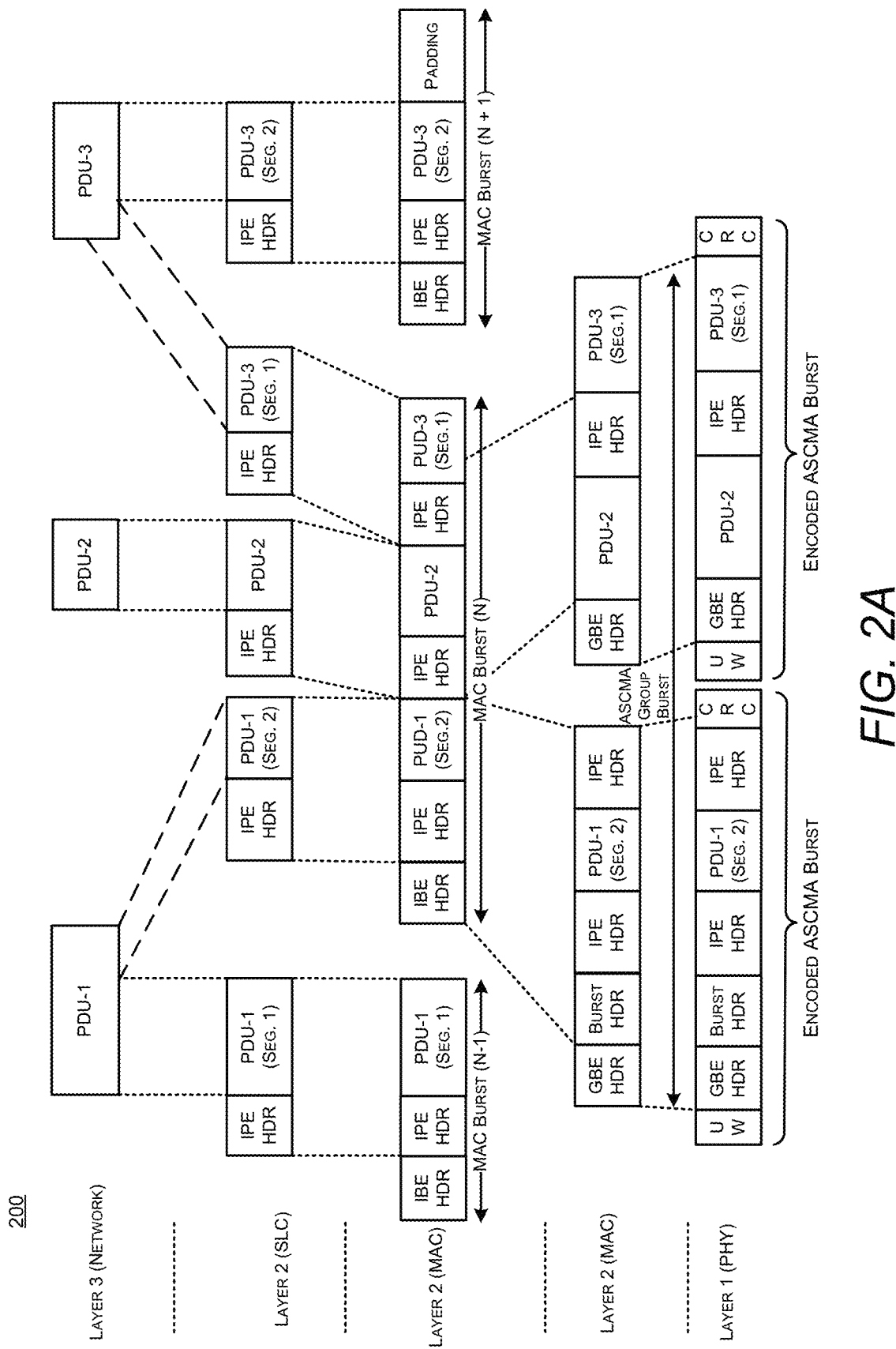
FIGS. 2A-2C illustrate examples depicting ASCMA transmission in form of encapsulated group burst packets, according to an example.
Figures 2B, 2C:
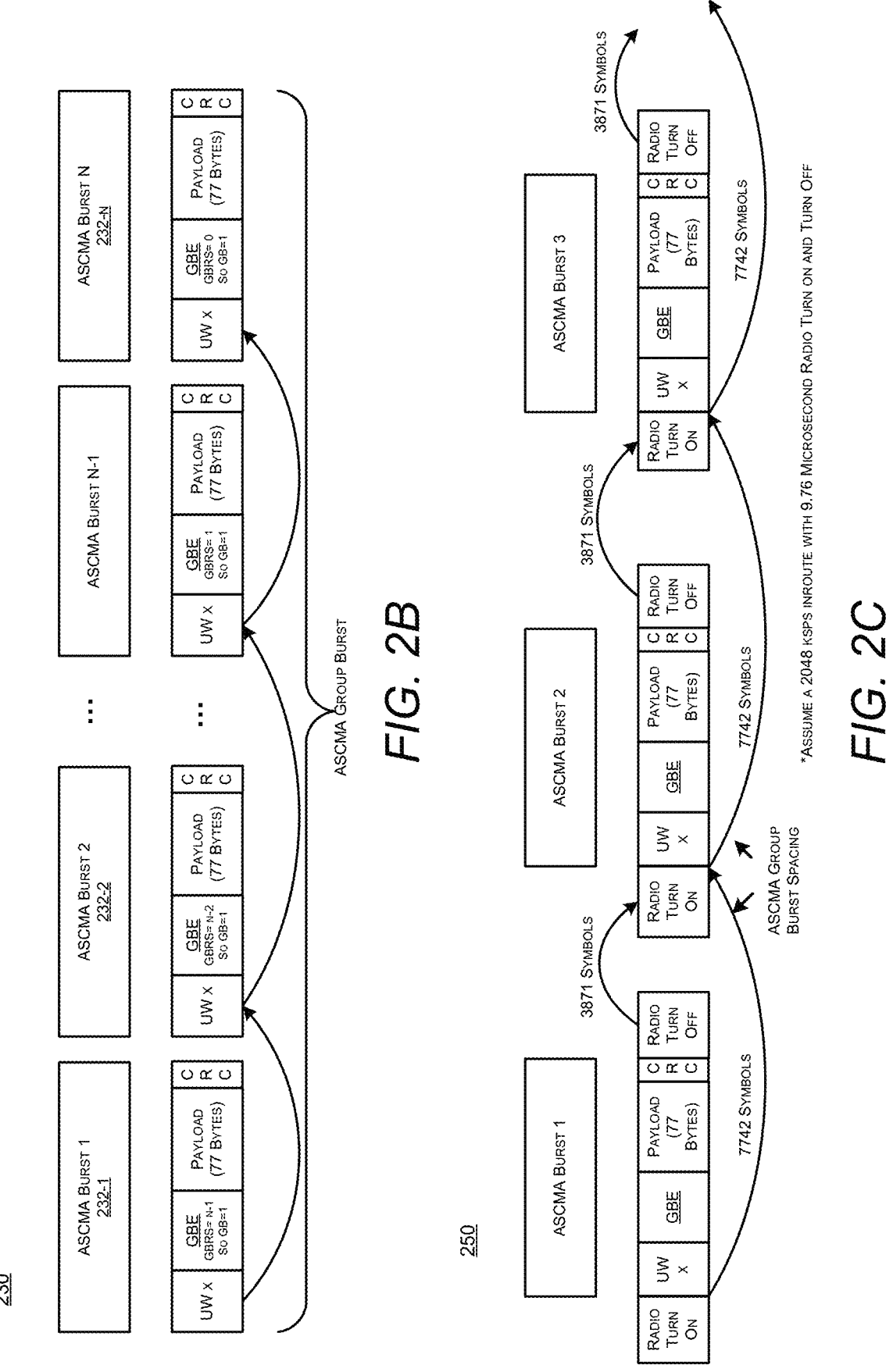

FIGS. 2A-2C illustrate examples 200, 230 and 250 respectively, depicting ASCMA transmission in form of encapsulated group burst packets, according to an example. As shown in 200 in FIG. 2A, and in an example, the multiple encapsulated group burst packets may include a process of encapsulating a link layer Inroute Burst Encapsulation (IBE) packet into multiple ASCMA bursts in order to avoid replicating the link layer IBE and Inroute Packet Encapsulation (IPE) overhead in each ASCMA burst. The representation 200 in FIG. 2A shows various layers involved in the implementation as well as the source of ASCMA group burst pertaining to the IBE packet and corresponding encapsulation (IPE overhead).

In some examples, the ASCMA group burst may be a sequence of back-to-back ASCMA bursts that may be used to encapsulate and deliver an IBE packet to the Gateway. In other words, the payload of an ASCMA group burst may be an IBE packet. As shown in 230 in FIG. 2B, in case of each group burst, shown as ASCMA Burst 1 (232-1), ASCMA Burst 2 (232-2), . . . , ASCMA burst N (232-N) (collectively referred as group bursts 232), a GBE header may be present (also shown in 200 in FIG. 2A).

The GBE header may include a Start of Group Burst (SoGB) flag and a Group Burst Remaining Size (GBRS) field. The SoGB flag may indicate whether or not the ASCMA burst may be first burst of a Group Burst. The GBRS field may indicate the number of ASCMA bursts left in this Group Burst after the current burst. For example, if a Group Burst requires a total of 10 ASCMA bursts, the GBRS field in the first burst may be set to 9, the GBRS field in the next burst may be set to eight 8, and similarly the GBRS field in the last burst of the Group Burst may be set to zero. In another example, if the entire group burst may fit in one ASCMA burst, the GBRS field may be set to zero (0).

Further, as shown in FIGS. 2A and 2B, and in an example, the ASCMA burst may include the unique word (UWs) that may enable to link the individual ASCMA bursts together during re-assembly. For example, each burst packet belonging to the same group may include the same unique word. In some examples and as shown in 230, the GBE header may be included in every ASCMA burst, as there may not be any unique word based coloring scheme (as in case of SCMA burst) to link the individual ASCMA bursts together. In some examples, the reassembling of an IBE packet from the multiple encapsulated group burst packets may be performed by Inroute Demodulator Controller (IDC) configured at the gateway. The IDC may re-assemble the IBE packet and forward to Inroute Group Manager (IGM) at the gateway. In some examples, the IDC may maintain a list pertaining to the group burst in progress (GBIP).

As shown in FIG. 2B, ASCMA group burst may include a unique word that may pertain to, for example, a single set of 64 unique words (UWs) (512-symbol). In some examples, longer unique words (512-symbol) may be used (instead of 255-symbol) to enable respective hardware to find out the unique words without the aid of an aperture. In some examples, fewer (i.e. only 64) unique words may improve hardware performance when searching for a match for the unique word. Further, fewer unique words may result in a higher probability of terminals that transmit at the same time using the same unique word but this may be compensated for by the asynchronous nature of ASCMA transmission providing significantly more timing jitter. It may be appreciated that although exemplary embodiments cover limited examples of UWs, it may be possible within the scope of the present disclosure to incorporate/use various other UWs to reduce the probability of UW based collision by implementing, for example, the requisite hardware for processing the UWs. In some examples, to support orthogonality of unique words usage between neighboring beams, there may be multiple ASCMA beam sets, for example, seven beam sets of 64 unique words. In some example, the ASCMA group bursts may be linked together by using the same unique word for each burst. For example, when getting ready to send a group burst, the terminal may randomly select a unique word in real time from among the 64 unique words in the beam set. Using the same unique word for the group bursts may reduce the processing burden associated with ASCMA transmission.

In some examples, the ASCMA group bursts may have a pre-defined spacing between them, which may be as illustrated in 250 in FIG. 2C. In an embodiment, the pre-defined spacing may refer to a distance, in symbols, from the start (i.e., the first symbol of the unique word) of one burst of the group burst to the start of the next burst of the group burst. In an alternate embodiment, the pre-defined spacing may refer to a distance, in symbols, from the end of one burst to the start of the next burst. In some examples, the processor determines at least one of the burst size or the pre-defined spacing (optimal value) to prevent a collision between packets pertaining to two separate groups. For example, if the bursts may be transmitted back to back, it may not provide enough entropy to meet the ASCMA individual burst error rate performance. It may be possible that a group burst collision may occur when two terminals transmit ASCMA bursts using the same starting symbol and the same unique word. This may lead to loss of one or both of the bursts. In some example, probability of collision may be reduced by proper spacing i.e. adding pre-defined spacing between the consecutive ASCMA bursts.

In some examples, spacing of at least one burst length between subsequent transmissions by the same terminal may optimize overall ASCMA burst reception performance. In other examples, a larger spacing may increase the probability of a group burst collision because it may increase the amount of time the group burst may be in a reassembly queue. Therefore, an optimal pre-defined spacing may be added, as exemplified in FIG. 2C i.e. 3871 symbols. In some examples, a receiver at a gateway may need to know the group burst spacing in order to find the right ASCMA bursts (i.e. belonging to the same group) when reassembling the group burst. For example, to achieve this, the pre-defined spacing may be signaled in the header of the first burst of the group burst. In another example, the associated overhead may be avoided by transmitting the bursts with a well known or commonly known spacing value. For example, by default, the spacing value may be two times the size of an ASCMA burst excluding radio turn on and turn off.

In an example, and as shown in FIG. 2C as well as Table 1, counting the unique word, the encoded payload and the pilot symbols, the size of an ASCMA burst may be 3871 symbols. In this example, the default spacing value may be 7742 symbols, which minimizes the probability of group burst collision while at the same time providing adequate spacing for individual burst transmission performance. In another example, 7742 symbols may be used as the minimum spacing required when the terminal transmits two ASCMA bursts, which may not be part of the same group burst.

In some examples, the ASCMA transmission may include a default payload to pilot ratio of 6:1, which means that one pilot symbol may be added after every six payload symbols. This may also be referred to as a pilot spacing of 7 (1 in 7) as every seventh symbol may be a pilot symbol. In some example, the pilot ratio being used may be signaled to the terminals. In an example, increase in pilot spacing may improve the burst performance but may require a larger ASCMA burst. In some examples, payload to pilot ratio of higher than 6:1 may only be supported by certain terminals, such as, for example, newer generation terminals, whereas the older generation terminals may only support the default pilot rate of 6:1. However, it may be appreciated that the mentioned pilot spacing may be only exemplary and other values/ratios can also be possibly used. Table 1 presents other possible ASCMA burst size and pilot spacings that may be implemented.

TABLE 1

| | Number | | | | |
|---|---|---|---|---|---|
| Total Burst Length (symbols) | of unique word Symbols | Number of Payload Symbols | Pilot Spacing | Number of Pilot Symbols | Simulation Performance ($\lambda = 12$) (BER) |
| 3871 | 512 | 2880 | 7 | 479 | 1.04E−03 |
| 3967 | 512 | 2880 | 6 | 575 | 1.03E−03 |
| 4111 | 512 | 2880 | 5 | 719 | 6.60E−04 |

In an example, the processor may facilitate enqueuing and dequeuing of the plurality of encapsulated group burst packets to optimize a packet loss rate within a pre-defined threshold. The enqueuing operation may enable to queue the ASCMA transmission in a high priority queue or a low priority queue. In another example, the processor facilitates randomization of the ASCMA transmission received from two separate terminals to enable recognition of the encapsulated group burst packets pertaining to two different groups. For example, the randomization may be based on the one or more of the following aspects:

The use of different Unique Words

The use of different timing based on a fact that the terminals can start transmitting at any random symbol time The use of different transmit power offsets In case of use of different transmit power offsets, each time the terminal may define a new transmit window for using ASCMA, it may select a random power offset. The amount of power jitter used with ASCMA may be significantly greater than that used with SCMA. For example, ASCMA may use a +/−5.5 dB window around a 5.5 dB Es/No target.

In an example, the processor may identify a minimum transmit opportunity spacing between two consecutive ASCMA transmissions for reducing latency in the transmission of the two consecutive ASCMA transmissions. For example, as shown earlier, two back to back ASCMA burst transmissions sent by the same terminal may start no less than the size of the burst, for example, 3871 symbols, plus the radio turn on plus radio turn off time apart. However, the transmit opportunity spacing may be independent from group burst spacing i.e. it may be larger or smaller than the group burst spacing. For example, in a 2048 ksps ASCMA inroute, a typical radio turn on/off time of 9.76 microseconds may be 20 symbols. So, the closest two bursts may be transmitted is 3911 symbols apart (from start to start). However, once the terminal may decide to use a transmit opportunity, any following transmit opportunities, which may occur while the group burst may be actually transmitting, may be ignored. Thus, the transmit opportunities may be theoretically spaced one symbol apart (i.e. one every symbol) with subsequent transmit opportunities skipped over once transmission actually starts. This may not work practically because the time taken to decide if a transmit opportunity should be used takes more than one symbol time. A more practical spacing model may require the transmit opportunities to be spaced based on terminal processing requirements. In some examples, checking often may minimize the waiting time when a packet may be ready to be transmitted but may include wasted processing time, especially each time no packed may be found ready for transmission.

Therefore, the processor may derive an optimal value that may minimize latency while also minimizing wasted processing. In some examples, a minimum spacing gap (Gmin) may be configurable with a default value equivalent to two milliseconds for a particular symbol rate, which may equate to 4096 symbols for a 2048 ksps inroute and 8192 symbols for a 4096 ksps inroute. This value may allow up to 23 transmit opportunities per frame. Various other values/examples may be possible.

Figures 3, 4:
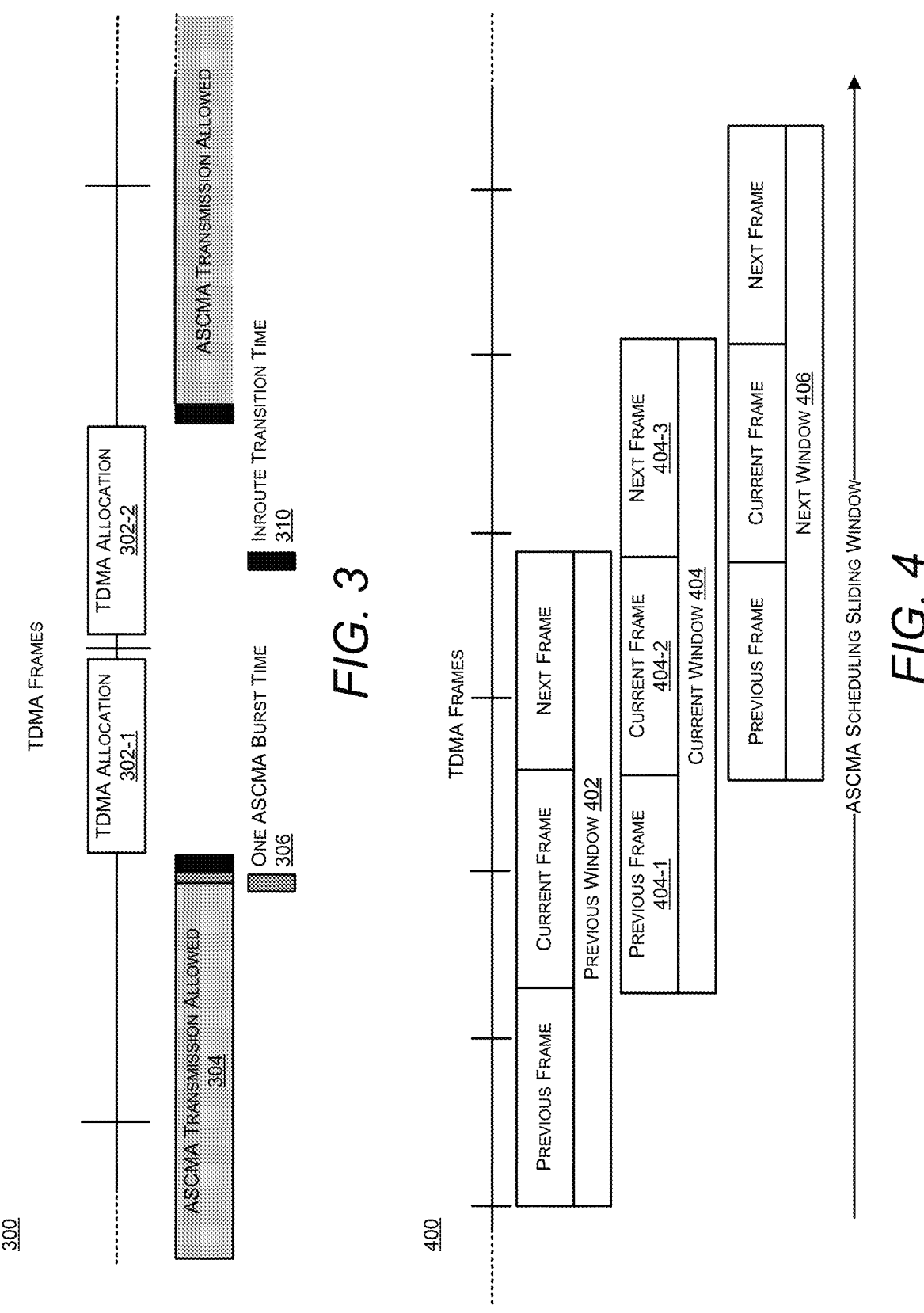
FIG. 3 illustrates examples of scheduling ASCMA transmission around a Time-division multiple access (TDMA) allocation, according to an example.
FIG. 4 illustrates example of implementing a sliding window approach to evaluate a TDMA allocation in an upcoming frame, according to an example.

In an example, the processor may evaluate scheduling frames corresponding to Time-division multiple access (TDMA) allocation for identification of a transmission opportunity window for the ASCMA transmission. Unlike SCMA, the ASCMA transmission may not require opening of apertures to transmit bursts (such as for expedited data). However, for ASCMA transmission, the transmit window may need to be defined taking into account TDMA allocations made to the terminal. The ASCMA transmission may involve scheduling to define time windows within which the terminal may be eligible to transmit and then randomly picking transmit opportunities within the windows to send group bursts. In some examples, in case of an existing TDMA allocation, the ASCMA transmission may be blocked for that particular time window. FIG. 3 illustrates example 300 of scheduling ASCMA transmission around a TDMA allocation, according to an example.

As shown in FIG. 3, a ASCMA transmission window 304 may be scheduled around a TDMA allocation 302-1. Further, before the TDMA allocation 302-1, an inroute transition time 306 may be present, which may represent a specific margin that may be needed to be provided before and after the TDMA allocation to allow the hardware time to change inroute frequencies and adjust transmit power. Further, the terminal may also allow time for the completion of any ASCMA burst 310, which may start at the very end of the ASCMA transmission allowed window 304. In some examples, a definite space may be present between the TDMA allocation 302-1 and the ASCMA transmission window 304 to allow for two inroute transitions and at least one ASCMA burst. In an example, ASCMA transmission may not be allowed between the two TDMA allocations 302-1 and 302-2, as shown in FIG. 3.

Further, as depicted in FIG. 3, the ASCMA transmission may not be limited by frame boundaries, unlike the SCMA transmission. In this case, as the ASCMA transmission may not be concerned with frame boundaries, it may be required to foresee or evaluate TDMA allocations for the frame beyond only an upcoming frame. This means that a first TDMA allocation in a following TDMA frame may be required to be checked. In some examples, the terminal may use a sliding window approach to evaluate TDMA allocations in an upcoming frame. FIG. 4 illustrates example 400 of implementing a sliding window approach to evaluate a TDMA allocation in an upcoming frame, according to an example. As shown in FIG. 4, the sliding window approach may be used to determine the possibility of frames in which ASCMA transmission may be allowed (i.e. frames that may be devoid of any TDMA allocation).

As illustrated in FIG. 4, a previous TDMA frame 404-1 may be looked at to see if ASCMA transmission may be already allowed entering the current TDMA frame 404-2. The current TDMA frame 404-2 may be looked at for TDMA allocations, which may block ASCMA transmission. Further, a next TDMA frame 404-3 may be looked at to see where the first TDMA allocation may be in the frame. This may be required to evaluate if the first TDMA allocation may be close enough to the start of the frame to enable stopping ASCMA transmission before the end of the current frame 404-2 or if it may be far enough to allow ASCMA transmission to continue into the next frame 404-3.

In some examples, the sliding window approach may evaluate the TDMA allocations for continuous sliding windows such as, for example, previous window 402, current window 404, next window 406 and so on. This means that in sliding window approach, as shown in FIG. 4, the current frame 404-2 of the current window 404 may be a previous frame for the next window 406, whereas the next frame 404-3 of the current window 404 may be a current frame for the next window 406 and so on. In some examples, if the TDMA allocation information may not be available, the terminal must assume that there may be an allocation at the start of the next frame. For example, if a bandwidth allocation packet (BAP) has not arrived yet or has been lost, the TDMA allocation information may not be available. However, it may be appreciated that in general, BAPs may be sent far enough in advance that the next frame's BAP may be available at the time the current frame may be scheduled.

In some examples, after determining when ASCMA transmission may be allowed (based on TDMA allocation), the terminal may need to decide a time instance of actual transmission. The terminal may determine the number of transmit opportunities to create based on system configuration, similar to SCMA transmission. However, unlike SCMA transmission, which then proceeds to pick from the available SCMA slots in the frame, the ASCMA technique may choose random symbol locations, which fall within the ASCMA transmission allowed windows, as shown in FIG. 5.

Figure 5:
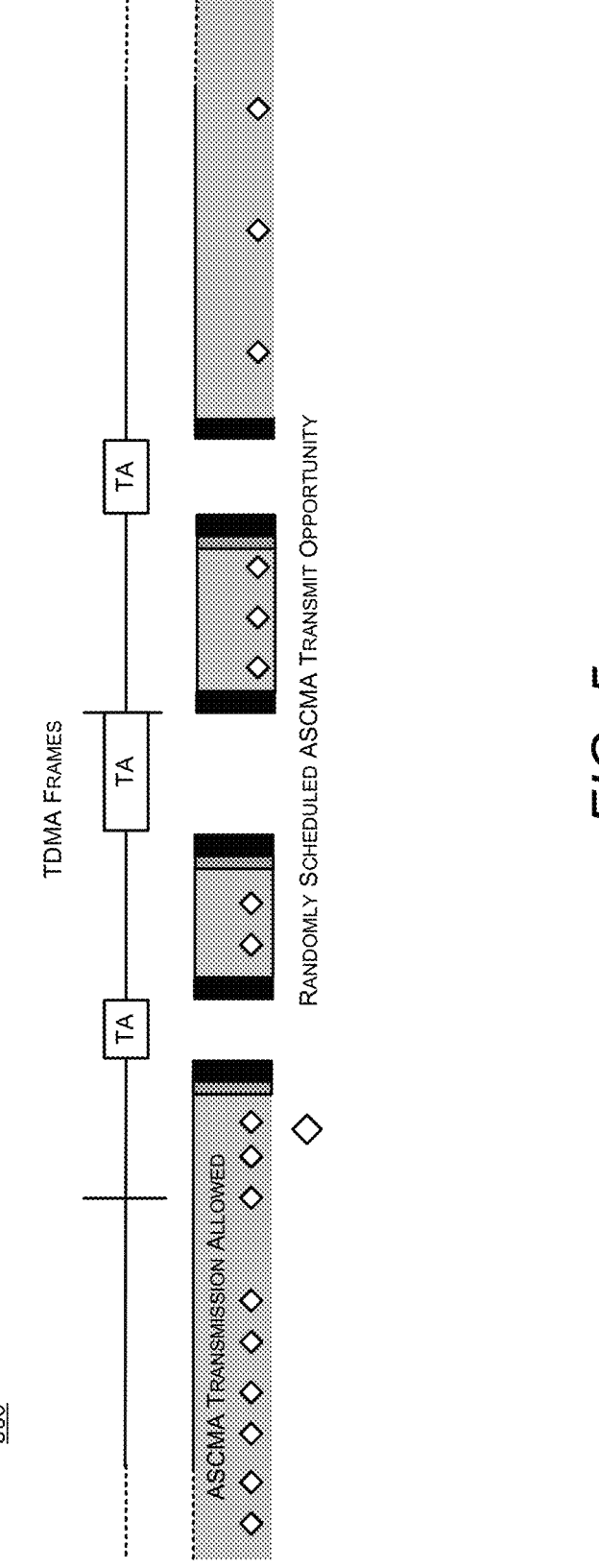
FIG. 5 illustrates example of implementing a randomly scheduled ASCMA transmit opportunity, according to an example.

FIG. 5 illustrates example 500 of implementing a randomly scheduled ASCMA transmit opportunity, according to an example. As shown in FIG. 5, TDMA inroute frame, slot and symbol numbering may be used as convenient reference handles for ASCMA transmission. In some examples, for satisfying requirements pertaining to meet the group burst (and burst) collision probability, a randomness may be implemented at the symbol level. The randomly selected transmit opportunities may be depicted in FIG. 5. Further, in order to obtain good latency performance, the transmit opportunities may need to be reasonably distributed in the ASCMA allowed transmission window.

Figure 6A:
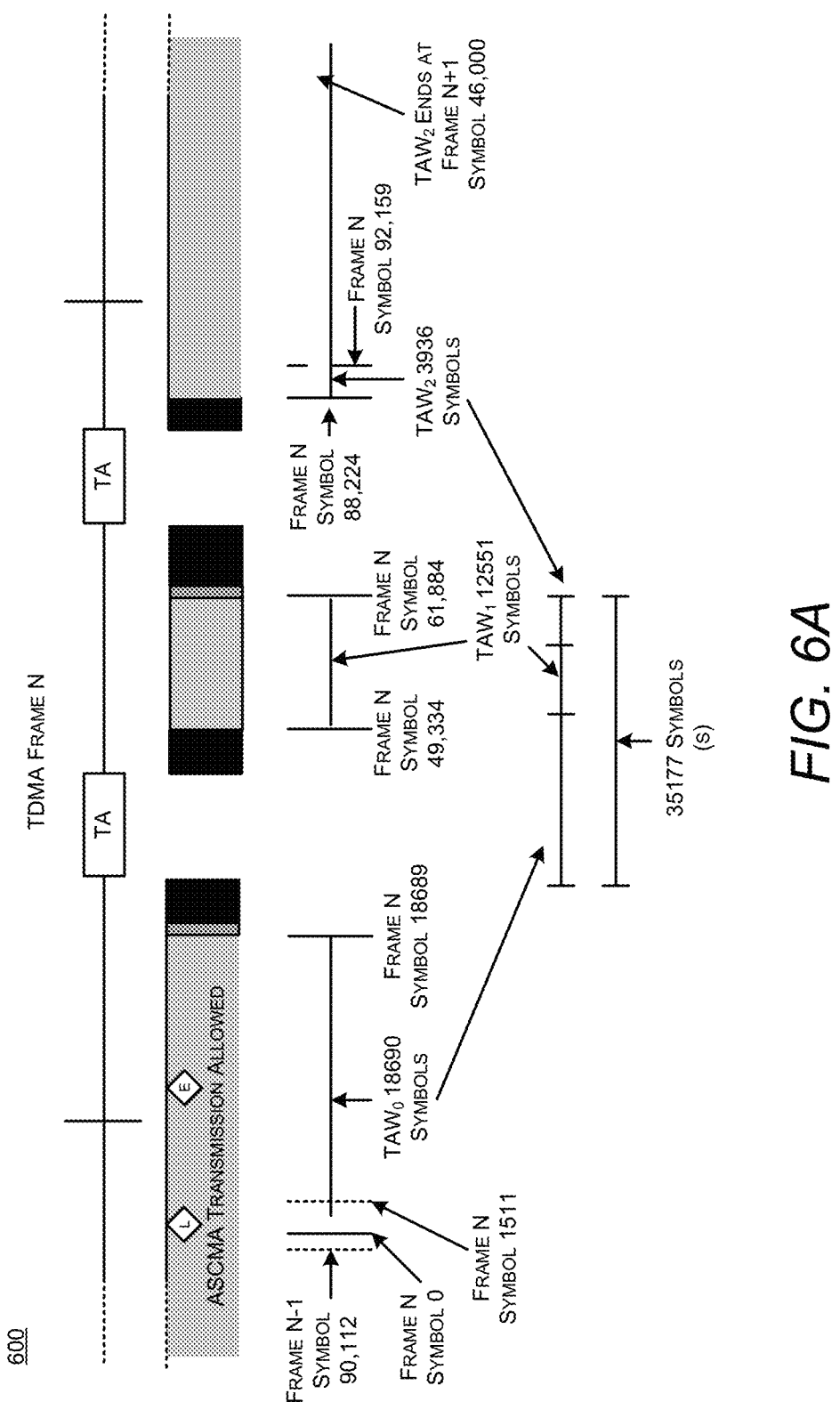
FIGS. 6A-6B illustrate examples for determining a transmit opportunity location in ASCMA transmission allowed window, according to an example.
Figure 6B:
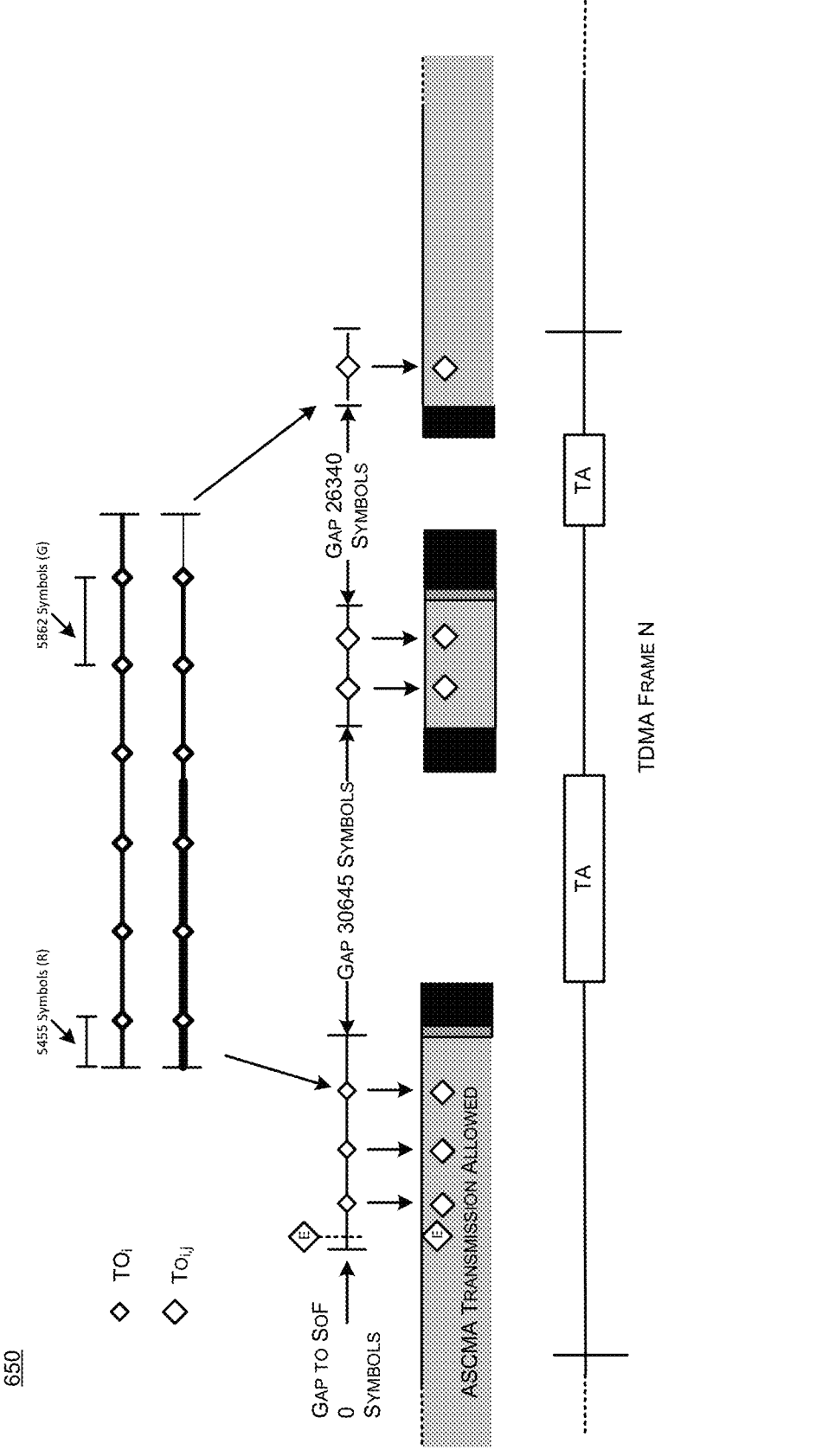

In some examples, the processor may implement an algorithm to determine transmit opportunity locations. FIGS. 6A-6B illustrate examples 600 and 650 respectively, for determining a transmit opportunity location in ASCMA transmission allowed window, according to an example. The examples as shown in FIGS. 6A and 6B, may include a 2048 ksps ASCMA inroute and (for simplicity) a 2048 ksps TDMA inroute. The determination of transmit opportunity location (as shown in FIGS. 6A and 6B) may be performed in a series of steps (or algorithm) as shown herein below:

Step-1:

In some examples, to determine the transmit opportunity locations, the algorithm or processor may determine number of Transmission Allowed Windows (TAWs) in the current frame. The processor may also determine size of the TAWs (in symbols) and the gap in front of each window to the end of a previous window or to the start of the current frame, whichever may be smaller, in addition to determining a cumulative gap in front of each window. In some examples, a special handling may be required if the last window in the frame crosses into the next frame. The processor may need to calculate both the size of the portion of the window in the current frame and the actual size to the end of the window in the next frame. For determining the actual size to the end of the window in the next frame, it may be assumed that the window may end at the end of the next frame with a TDMA transmission at the beginning of the frame after that. If next frame information may not be available, it may be assumed that there may be a TDMA allocation at the start of the next frame. This may require backing the end of the window off from the end of the frame by the size of an ASCMA burst (for example, with 3871 symbols). The distribution based calculation for TAWs for frame N may be depicted in FIG. 6A, and further shown in Table 2 below.

TABLE 2

| TAWs for Frame N of FIG. 6A | | | | | | | |
| --- | --- | --- | --- | --- | --- | --- | --- |
| Example Transmission Allowed Windows | | | | | Cumulative | Actual End | |
| Number | Gap | Start | End* | Size* | Gap | Frame | Symbol |
| 0 | 0 | 0 | 18689 | 18690 | 0 | N | 18689 |
| 1 | 30645 | 49334 | 61884 | 12551 | 30645 | N | 61884 |
| 2 | 26340 | 88224 | 92159 | 3936 | 56985 | N + 1 | 46000 |
| | | | Total: | 35177 | | | |

*In the current frame

Step-2:

The processor may determine the total number of symbols S, in the current frame where the ASCMA transmission may be allowed. As shown in FIG. 6A and also in Table 2, the frame N (with total number of 35177 symbols) may be distributed over 3 different TAWs pertaining to ASCMA allowed transmission. This may be calculated by adding up the sizes, in symbols, of the portions of the transmission allowed windows which may be in the current frame. For the mentioned example in FIG. 6A and in Table 2, the total number of symbols, $$S=18690+12551+3936=35177 \text{ symbols.}$$

Step-3:

Further, using location L of the last transmit opportunity in a previous frame, the processor may determine the earliest symbol E (shown in FIG. 6A) to use for a transmit opportunity in the current frame. In some examples, the earliest allowed transmit opportunity may be calculated by adding minimum gap ($G_{min}$) between transmit opportunities to the last transmit opportunity of the previous frame and then subtracting from this value, the number of symbols in a frame (92160 for a 2048 ksps inroute) such that if the value may be negative, then the value of E may be set as (where $E=MAX\ (((L+G_{min})-92160),\ 0)$. For the mentioned example in FIG. 6A, assuming L may be 90112, and hence $$E=(90112+4096)-92160=1511.$$

Step-4:

The processor may set the number of desired transmit opportunities which need to be scheduled (N) as equal to the currently configured limit. For example, it can be assumed that N may be equal to 6 (where maximum value of N may be equal to the number of symbols in a frame divided by the minimum gap size).

Step-5:

The processor may further determine the maximum number of transmit opportunities (M) which may fit in the current frame given the minimum gap ($G_{min}$) desired between transmit opportunities by dividing the total number of symbols S by the minimum gap size (and truncating the result), $$\text{where } M=TRUNC(S/G_{min}).$$

For example, $$M=TRUNC(35177/4096)=8.$$

Step-6:

In some examples, if N>M, the processor or algorithm may create M transmit opportunities distributed across the frame, as shown in the sub-steps below. However, if N may not be greater than M then the processor may perform Step-7. The processor may perform the following sub-steps:

Picking a random number, R, between 0 and $G_{min}-1$. This may be the random offset to be used within the current frame.

Defining the transmit opportunities ($TO_m$) using a loop increasing m from 0 to M−1, multiplying m by the minimum spacing gap and then adding R $$\text{For } m=0 \text{ to } M-1,\ TO_m=(m*G_{min})+R$$

Proceeding to Step 8

In some examples, if N may be less than M, this step-6 may be skipped.

Step-7:

In some examples, if N may not be greater than M, then step-7 may be selected, where the processor may create N transmit opportunities distributed across the frame, based on the sub-steps as explained herein below:

Determining spacing gap (G) to be used for the frame by dividing the number of symbols from Step 2, S, by N (and truncating the result). For example, G=TRUNC (S/N)=TRUNC (35177/6=5862).

Picking a random number, R, between 0 and G−1. This may be the random offset to be used within the current frame. For example, assuming R may be equal to 5455.

Defining the transmit opportunities ($TO_n$) using a loop increasing n from 0 to N−1, multiplying n by the calculated spacing gap and then adding R.

For example, $$\text{for } n=0 \text{ to } N-1, TO_n=(n*G)+R$$

$$TO_0=(0*5862)+5455=5455$$

$$TO_1=(1*5862)+5455=11317$$

$$TO_2=(2*5862)+5455=17179$$

$$TO_3=(3*5862)+5455=23041$$

$$TO_4=(4*5862)+5455=28903$$

$$TO_5=(5*5862)+5455=34765$$

Step-8:

Based on step-6 or step-7, the processor may convert the set of transmit opportunities or TOs into values which actually fall within the transmission allowed windows (as shown in FIG. 6B) and as explained in the following sub-steps. FIG. 7 illustrates a tabular data 700 showing mapping of transmit opportunities (TOs) to each Transmission Allowed Windows (TAWs) of FIG. 6B, according to an example. If after conversion a value may be less than E, then the value may be discarded. This may only be possible for at most the first entry.

For each transmit opportunity, $TO_i$ for each transmission allowed window, $TAW_j$ adding the sum of the gaps in front of $TAW_j$ to $TO_i$ to map $TO_i$ into that window, $TO_{i,j}$. For example, the results may be shown in FIG. 7 (and in FIG. 6B).

For each $TO_{i,j}$, determine if it actually falls in $TAW_j$ by comparing the value to the boundaries of $TAW_j$. Discard any $TO_{i,j}$ values which may not be actually in the window. At the end, each $TO_{ij}$ value should be within exactly one window. For the continuing example, the boundaries may be shown in Table 2 and the non-discarded values may be highlighted in the table in FIG. 7.

If $T_{0,0\ may\ be}$ less than E, then it may be discarded, although this may not apply for the mentioned example.

Step-9:

The processor may create Group Burst transmit opportunities corresponding to the remaining (not discarded) $T_{i,j}$ values. Each Group Burst transmit opportunity may require at least one of the following information:

Location of the transmit opportunity

Unique word to be used for the group burst

Transmit power to be used for the group burst

The maximum number of ASCMA bursts which can be included in a group burst which starts at this transmit opportunity A pointer to a generic IBE header to be used if the transmit opportunity may be actually used.

In some examples, the unique word and/or the transmit power may be determined upon determination of the ASCMA transmit allowed window. In some examples, the maximum number of bursts which can be included in a group burst starting from a transmit opportunity may be determined by subtracting the location of the transmit opportunity symbol location from the end of the window symbol location and then dividing the result by the group burst spacing interval, followed by rounding up the final value. However, the resultant value may be bounded by the current maximum size of a group burst, as also shown in FIG. 7.

Figure 8A:
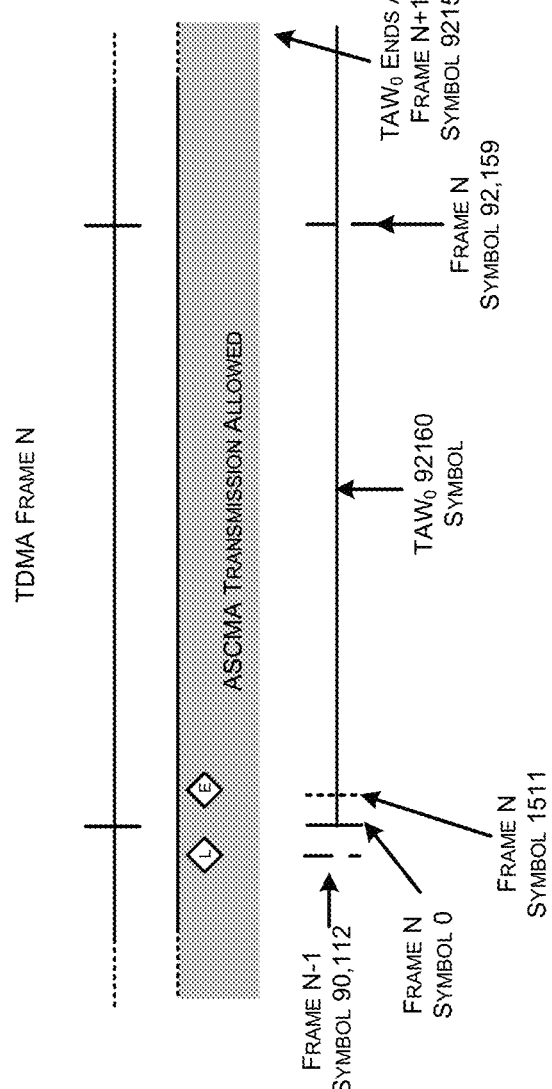
FIGS. 8A-8B illustrate examples for determining a transmit opportunity location in an idle condition of a terminal including no TDMA allocation window, according to an example.
Figure 8B:
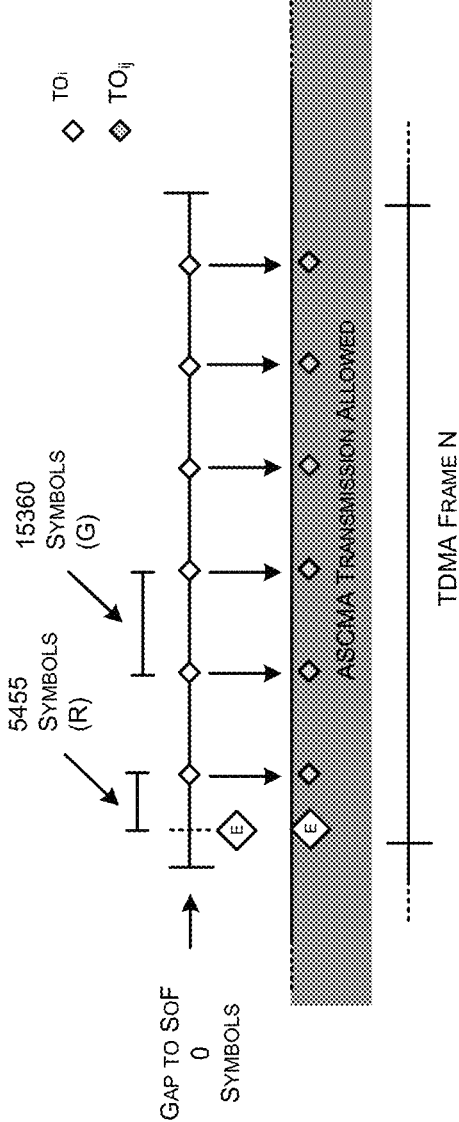

In some examples, the processor may implement an algorithm to determine transmit opportunity locations when a terminal may be idle or may have no TDMA allocations. FIGS. 8A-8B illustrate examples 800 and 850 respectively, for determining a transmit opportunity location in an idle condition of a terminal including no TDMA allocation window, according to an example. The examples as shown in FIGS. 8A and 8B, may be performed in a series of steps (or algorithm) as shown herein below:

Step-1:

In some examples, the processor may determine number of Transmission Allowed Windows (TAWs) in the current frame, the size of the windows (in symbols) and the gap in front of each window to the end of the previous window or to the start of the current frame, whichever may be smaller. The cumulative gap in front of each window may be also required. If the last window in the frame crosses into the next frame, the processor may calculate both the size of the portion of the window in the current frame and the actual size to the end of the window in the next frame. In this example, the end of the window symbol may not be backed away from the frame end by the size of an ASCMA burst because the terminal may evaluate that no TDMA allocations may be present at the beginning of frame N+2. Since the terminal may be idle, it may be concluded that there may be no TDMA transmissions scheduled, as shown in FIG. 8A, with corresponding values of the symbols as summarized in Table 3 herein below:

TABLE 3

| TAWs for Frame N of FIG. 9A | | | | | | | |
|---|---|---|---|---|---|---|---|
| Example Transmission Allowed Windows | | | | | Cumulative | Actual End | |
| Number | Gap | Start | End | Size | Gap | Frame | Symbol |
| 0 | 0 | 0 | 92159 | 92160 | 0 | N + 1 | 92159 |
| | | | Total: | 92160 | | | |

Step-2:

The processor may determine the total number of symbols (S) in the current frame where the start of an ASCMA transmission may be allowed. This may be performed by adding up the sizes (in symbols) of the portions of the transmission allowed windows which may be in the current frame. For example, in the example as shown in FIG. 8A, the number of symbols (S) may be 92160 symbols.

Step-3:

The processor may, using the location, L, of the last transmit opportunity in the previous frame, determine the earliest symbol E (as shown in FIG. 8A) to use for a transmit opportunity in the current frame. The processor may calculate the earliest transmit opportunity allowed by adding the minimum gap ($G_{min}$) between transmit opportunities to the last transmit opportunity of the previous frame and then subtracting from this value the number of symbols in a frame (for example, 92160 for a 2048 ksps inroute). If the value may be negative, then value of E may be set to 0 (where $E = \text{MAX}(((L+G_{min})-92160), 0))$ For example, in case when the terminal may be idle, assuming that L may be 90112, then $$E = (90112+4096) - 92160 = 1511.$$

Step-4:

The processor may set the number of desired transmit opportunities which need to be scheduled, N, equal to the currently configured limit. For example, the value of N may be equal to 6 (assuming simple value).

Step-5:

The processor may determine the maximum number of transmit opportunities (M) which may fit in the current frame given the minimum gap ($G_{min}$) desired between transmit opportunities by dividing the total number of symbols (S) determined in the Step-2 by the minimum gap size (and truncating the result). where $M = \text{TRUNC}(S/G_{min})$. For example, $$M = \text{TRUNC}(92160/4096) = 22.$$

Step-6:

In some examples, if N>M, the processor or algorithm may create M transmit opportunities distributed across the frame, as shown in the following sub-steps. However, if N may not be greater than M then the processor may perform Step-7. The sub-steps in case of N>M may be as shown below:

Picking a random number, R, between 0 and $G_{min}-1$. This may be the random offset to be used within the current frame.

Defining the transmit opportunities ($TO_m$) using a loop increasing m from 0 to M-1, multiplying m by the minimum spacing gap and then adding R. For m=0 to M-1, $TO_m = (m*G_{min})$ R Proceeding to Step 8

In some examples, if N may be less than M, this step-6 may be skipped.

Step-7:

In some examples, if N may not be greater than M, then step-7 may be selected, where the processor may create N transmit opportunities distributed across the frame, based on the sub-steps as explained herein below:

Determining the spacing gap, G, to be used for the frame by dividing the number of symbols, S, from Step 2 by N (and truncating the result). For example, $$G = \text{TRUNC}(S/N) = \text{TRUNC}(92160/6 = 15360).$$

Picking a random number, R, between 0 and G–1. This may be the random offset to be used within the current frame. For example, it may be assumed that R may be equal to 5455.

Defining the transmit opportunities ($TO_n$) using a loop increasing n from 0 to N–1, multiplying n by the calculated spacing gap and then adding R.

For example, for $n$=0 to $N$–1,$TO_n$=$(n*G)+R$

For example, $TO_0$=(0*15360)+5455=5455

$TO_1$=(1*15360)+5455=20815

$TO_2$=(2*15360)+5455=36175

$TO_3$=(3*15360)+5455=51135

$TO_4$=(4*15360)+5455=66895

$TO_5$=(5*15360)+5455=82225

Step-8:

Based on step-6 or step-7, the processor may convert the set of transmit opportunities or TOs into values which actually fall within the transmission allowed windows (as shown in FIG. 8B) and as explained in the following sub-steps. FIG. 9 illustrates a tabular data 900 showing mapping of transmit opportunities (TOs) to each Transmission Allowed Windows (TAWs) of FIG. 8B, according to an example. If after conversion a value may be less than E, then the value may be discarded. This may only be possible for at most the first entry For each transmit opportunity, $TO_i$ for each transmission allowed window, $TAW_j$ adding the sum of the gaps in front of $TAW_j$ to $TO_i$ to map $TO_i$ into that window, $T_{i,j}$. For example, the results may be trivial, as provided in shown in the table in FIG. 9.

For each $TO_{i,j}$, determining if it actually falls in $TAW_j$ by comparing the value to the boundaries of $TAW_j$. For the idle example, the will only be one window and thus there may be no need to discard any $TO_{i,j}$ values. For the idle example, the boundaries may be shown in Table 3 and the values may be highlighted in FIG. 9.

If $T_{0,0}$ may be less than E, then it may be discarded, although this may not apply for the mentioned example.

Step-9:

Similar to step-9 of the algorithm explained with respect to the FIGS. 6A-6B, the processor may create Group Burst transmit opportunities corresponding to the remaining (not discarded) $T_{i,j}$ values based on at least one information (location, unique word, transmit power, maximum number of ASCMA bursts, pointer to generic IBE header), as explained earlier.

In some examples, number of symbols in a 45 millisecond period (i.e. a TDMA frame) may depend on the symbol rate of the inroute selected for the ASCMA transmission. Table 4 explains the number of symbols per inroute frame for some common inroute symbol rates. In some examples, when using TDMA bandwidth allocations to determine the boundaries of a Transmission Allowed Window (TAW), the starting and ending symbol numbers of the TDMA allocation may be required to be converted into the equivalent symbol numbers for the ASCMA inroute. The first and second TDMA allocations shown in FIGS. 6A and 6B may just pass 14 millisecond point and 35 millisecond point, respectively, after the start of the frame.

For effective conversion, Table 4 includes the starting symbol number for each inroute symbol rate for TDMA bursts, which may start at the 14 and 35 milliseconds points after the beginning of the TDMA frame. As shown in the Table 4, converting symbol numbers from one symbol rate to another may include multiplying the TDMA symbol number by the ratio of the ASCMA symbol rate divided by the TDMA symbol rate. For example, if TDMA burst allocation on 6144 ksps inroute starts at symbol number 120000 and ends at symbol number 126960 and the ASCMA symbol rate is 4096 ksps, the equivalent 2048 symbol numbers may be equal to 120000*(4096/6144)=80,000 and 126960*(4096/6144)=84640.

TABLE 4

| Inroute Symbol Rate | | | |
|---|---|---|---|
| Symbol Rate (sps) | Symbols per 45 milliseconds | 14 millisecond Symbol Number | 35 millisecond Symbol Number |
| 256000 | 11520 | 3584 | 8960 |
| 512000 | 23040 | 7168 | 17920 |
| 1024000 | 46080 | 14336 | 35840 |
| 2048000 | 92160 | 28672 | 71680 |
| 4096000 | 184320 | 57344 | 143360 |
| 6144000 | 276480 | 86016 | 215040 |
| 8192000 | 368640 | 114688 | 286720 |
| 12288000 | 552960 | 172032 | 430080 |

In an example, the processor may facilitate the ASCMA transmission of at least one of a system control information or an expedited user data to minimize corresponding latency. The ASCMA may be used to transmit two types of information i.e. system control information and expedited user data. The system control information may be sent by the terminal to the IGM. The system and method described herein may enable to minimize latency for expedited user data.

Figure 10:
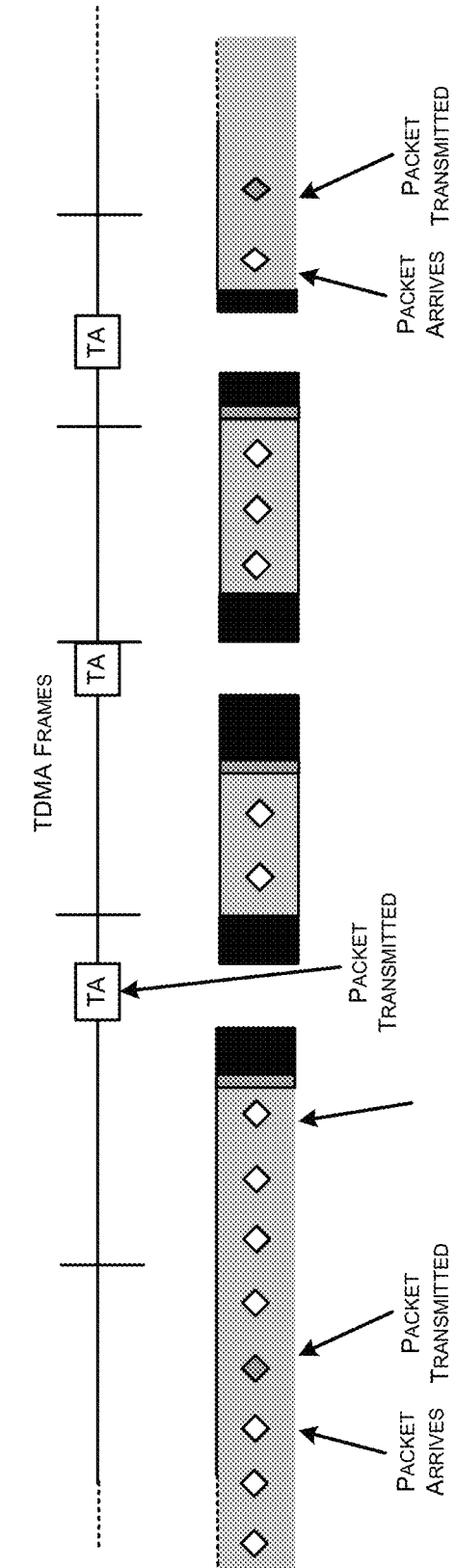
FIG. 10 illustrates an example for transmission of expedited user data, according to an example.

FIG. 10 illustrates an example 1000 for transmission of expedited user data, according to an example. As shown in FIG. 10, the latency may be minimized for the expedited user data by transmitting the expedited user data packets as soon as they arrive. In some examples, at each scheduled transmit opportunity, the system at the terminal may check to see if there may be one or more eligible expedited packets to be sent. In alternate examples, the system at the terminal may check at pre-defined time intervals before a transmit opportunity in order to allow for processing time and radio turn on time if a burst may be actually sent.

Based on the evaluation, if at least one such packet may be found, the system may further evaluate to check if it can currently send expedited data. In some examples, the ASCMA transmission of the expedited user data may be performed based on a token pertaining to a transmit token bucket. For example, presence of at least one token in the transmit token bucket may indicate that expedited user data may be sent. If no token may be available, the expedited data may wait for a token to be available at a future transmit opportunity. In some examples, special care may be taken with token replenishment to avoid having every terminal get a token at the same time, which may ensure synchronization to ASCMA data transmission.

In some examples, the tokens may be added (and removed) from the token bucket for use by the transmitter as part of ASCMA congestion control. In an example, if a token may be available, the transmitter may remove the oldest token and builds an appropriately sized group burst for transmission. In some examples, the expedited user data may be transmitted as the encapsulated group burst packets in accordance with a size requirement. The size requirement may pertain to at least one of the following criteria:

1. a size required to send an expedited packet, 2. a maximum size of a encapsulated group burst packet fitting the available transmit opportunity window or 3. a maximum size of the encapsulated group burst packet allowed by the terminal configuration.

In some examples, if the second or third condition results in a smaller group burst than the first condition, the group burst may be sent with as much of the eligible packet(s) as possible. If the first condition may result in the smallest group burst, the possibility may exist that the eligible packet(s) may not entirely fill the ASCMA burst payload of the last burst. In this case, the terminal may fill in the remaining space with packets from other transmit queues in the same manner as that of SCMA. In an example, padding (as shown in FIG. 2A) may be only sent if there may be no other traffic to use. In some examples, less padding may be used with ASCMA because only the last burst of the group burst may need padding since the group burst size may be dynamically determined based on requirement of the expedited data.

With synchronous SCMA, the group burst size may be determined in advance and cannot be truncated, thus, more than one burst of the Group Burst might need padding. The maximum size group burst that fits starting from a particular transmit opportunity may be determined in advance by a scheduling algorithm, as described earlier. For example, the absolute maximum group burst size may be 32 bursts since the group burst remaining size (GBRS) field in the group burst header may be only five bits, where 32 bursts may support ASCMA group burst with a total payload of $32\times77=2464$ bytes. In some examples, after determining the size of the group burst to transmit, the terminal may build the group burst. The first burst may be sent at the transmit opportunity symbol, where each of the other bursts may be sent exactly one spacing gap apart (for example, 7742 symbols). More specifically, the first symbols of the unique word of each burst may be sent at those locations.

Figure 11:
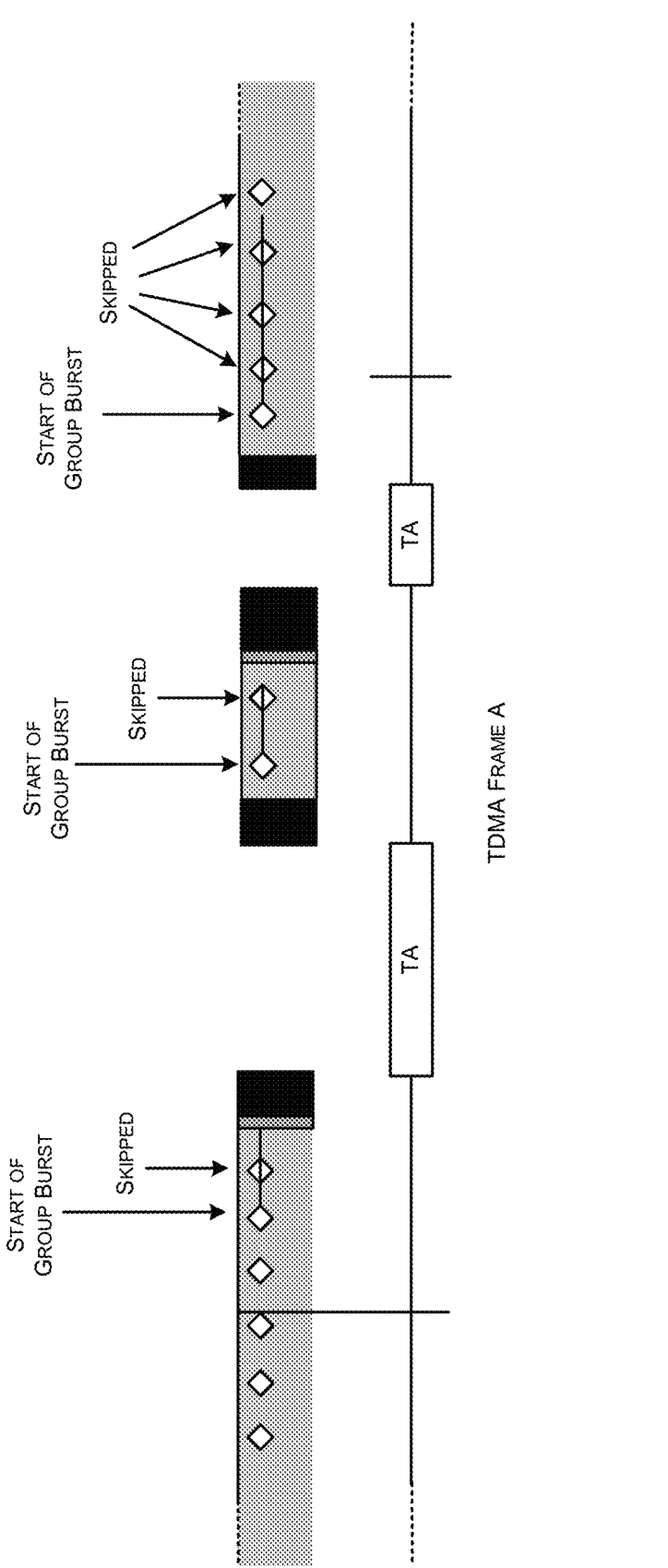
FIG. 11 illustrates an example for transmission showing skipping of overlapped transmit opportunities, according to an example.

FIG. 11 illustrates an example 1100 for transmission, depicting the skipping of overlapped transmit opportunities, according to an example. As the scheduled ASCMA transmit opportunities may be close, it may be possible that a transmission of a group burst can overlap with future scheduled transmit opportunities. In an example and as shown in FIG. 11, the overlapped transmit opportunities may be skipped over to address this problem. In some examples, a next transmit opportunity after conclusion of the group burst may also need to be skipped over if the group burst ends too close that transmit opportunity to use it. It may be possible that scheduler of transmit opportunities may create transmit opportunities in the next frame which may not be usable because of a group burst being already in progress.

In some examples, apart from expedited user data, a terminal may also send system control messages to the IGM at the gateway. The system control messages may be transmitted as adaptation messages in the IBE header. In some examples, when a terminal may be active i.e. a terminal may be receiving TDMA bandwidth allocations, adaptation messages may be sent in TDMA bursts. In alternate examples, when the terminal may be idle, adaptation messages (and requests to go active) may be sent using ASCMA group bursts. In some examples, when the terminal may be idle, the system messages may be essential to be sent immediately i.e. within the next n TDMA frame times, where n may be a configurable, very small number (typically one for ASCMA), without waiting for expedited data to arrive to trigger a group burst transmission. Further, no token may be needed to send a system message. In some examples, when there may arise a need to send a system message, the terminal may randomly pick a frame within the next n frames and then randomly select one of the eligible ASCMA transmit opportunities in that frame and marks it as mandatory to use. This may be possible if an ASCMA transmit opportunity may be Aloha eligible, i.e., if the maximum Group Burst size for that transmit opportunity may be large enough to hold the entire IBE header.

Figures 12A, 12B:
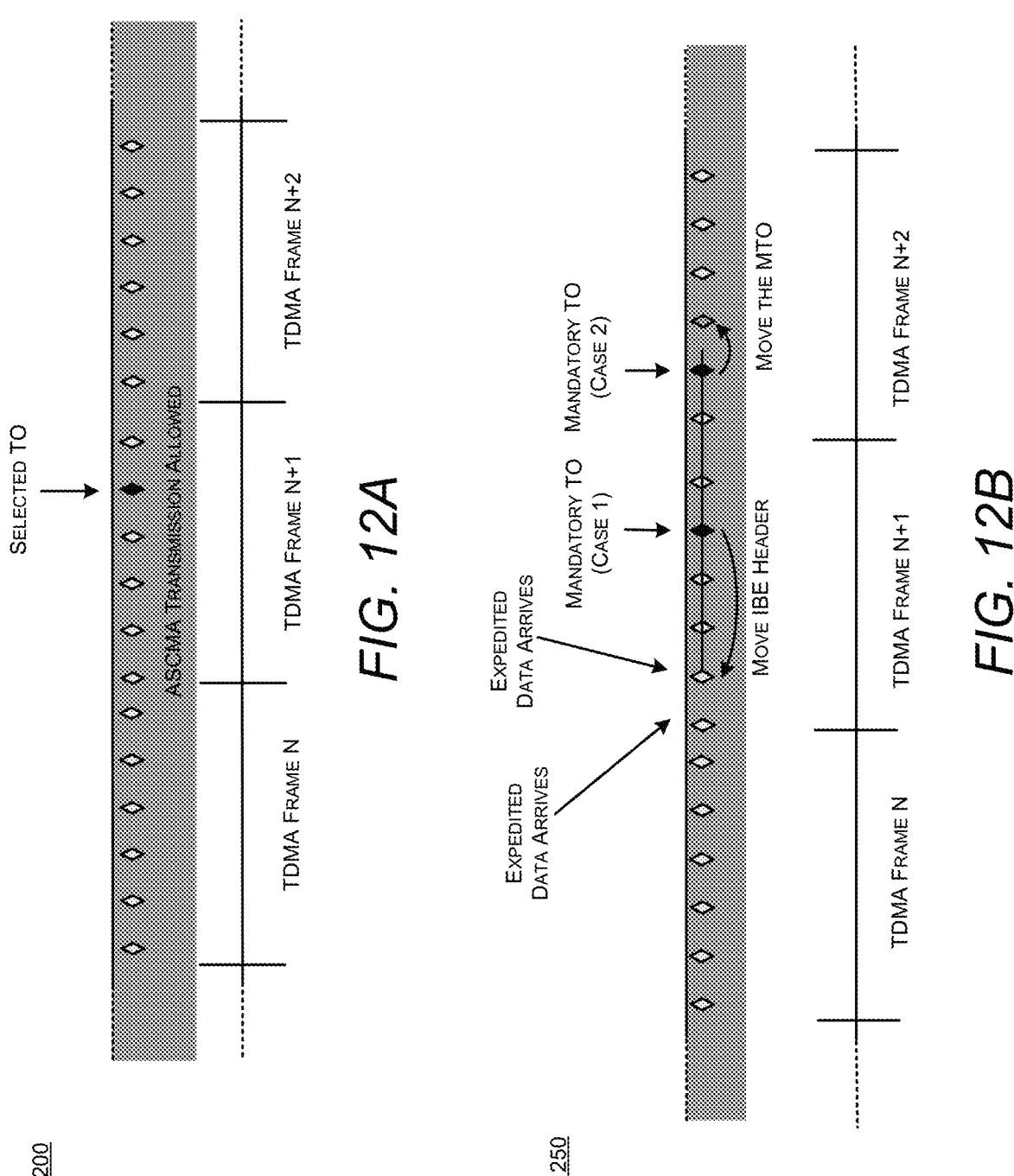
FIG. 12A illustrates an example for a mandatory selection of a transmit opportunity for transmitting a system message, according to an example.
FIG. 12B illustrates an example for a skipping a mandatory transmit opportunity, according to an example.

FIG. 12A illustrates an example 1200 for a mandatory selection of a transmit opportunity for transmitting a system message, according to an example. As shown in FIG. 12A, the selection of the ASCMA transmit opportunity (TO) may be random and/or mandatory to avoid front loading of these types of ASCMA Group Bursts in the frame. In some examples, the terminal may pre-build the IBE header with appropriate adaptation messages included and may update the transmit opportunity to point at the IBE header. Upon reaching the mandatory transmit opportunity, the transmitter may construct a group burst regardless of whether or not there may be any data in the expedited data queue. If there may be expedited data and there may be a token, it may be included in the group burst to the extent it fits into the available group burst space. In some examples, if there is no expedited data, or there is no token, the group burst may be sized to be the smallest required burst to send the entire IBE header. In some examples, if there may be leftover room in the last burst of the group burst, the transmitter may send data from expedited and non-expedited data queues (if any may be available) to avoid sending padding in the last burst of the Group Burst.

In some examples, the expedited user data may need to be transmitted in a regular transmit opportunity before the mandatory transmit opportunity is reached and the size of the group burst may be large enough to need to skip over the mandatory TO (or MTO). FIG. 12B illustrates an example 1250 for a skipping a mandatory transmit opportunity, according to an example. As shown in FIG. 12B, there may be two cases, case 1 and case 2. In case 1, the MTO may be scheduled and may be visible to the transmitter for various reasons, for example, because it may be in the same frame. In this case, the transmitter may detect that the size of the group burst may overlap the MTO. Therefore, the transmitter, instead of using the generic IBE header pointed at by the starting transmit header, may utilize the IBE header pointed at by the MTO. The transmitter may then recalculate the size of the Group Burst it needs to send using this IBE header.

In case 2 (as shown in FIG. 12B), the MTO may not be scheduled yet or at least the information may not be yet been provided to the transmitter. In this case, the transmitter may not detect the MTO until after it has started transmitting the group burst. For this case, the transmitter may move the MTO the next usable transmit opportunity. This may be the first TO after the current group burst ends, unless the current Group Burst ends too close to that TO to allow its use, in which case the MTO may be moved to the first TO following it.

In some examples, upon transmission of the encapsulated group burst from the terminal, the processor may analyze, based on an acknowledgement received by the terminal, a burst error rate pertaining to the ASCMA transmission for the selected inroute channel. In some examples, the acknowledgement pertains to at least one of partial receipt, non-receipt, or complete receipt of the encapsulated group burst packets.

In some examples, it may be it possible that an ASCMA group burst may not be successfully received. In this case, there may be no or partial acknowledgement for the group burst in the group burst acknowledgements being received by the terminal. As in some cases, the system messages may be important, there may be a need for the terminal to retransmit in the event that an ASCMA group burst may not be acknowledged. In an example, the terminal may use increasing longer randomization intervals when picking the mandatory to use transmit opportunity up until a maximum backoff may be reached. In another example, if the terminal does not receive an acknowledgement to an advanced configurable number (N) of attempts in a row, it switches to using special transmit power handling. In this case, the terminal may stop randomizing its power and may start systematically setting it, for example, starting with 5.5 dB as the target, the terminal may retry sending another N times. If no acknowledgement may be received, the terminal may start increasing the transmit power by a configurable number of dB for the next N attempts, repeating this process until it reaches an advanced configurable maximum (which defaults to full power). Various other possible techniques may be used for error handling.

In some examples, if the group burst may be received properly, the IDC at the gateway, may be responsible for reassembling the IBE packet from the individual ASCMA bursts of a group burst before forwarding it on to the IGM. In some examples, IDC may need to be able to recognize ASCMA bursts that belong to the same group burst. This requires knowing via advanced configuration regarding the respective group burst spacing. To aid in Group Burst reassembly, the IDC may keep a Group Bursts in Progress (GBIP) list.

In an example embodiment, each entry in the list may include at least one of the following information:

The unique word associated with the group burst
The Group Burst Remaining Size (GBRS) received in the most recent ASCMA burst received for this group burst
The expected starting location (in symbols) of the next ASCMA burst associated with this group burst
The IBE "packet" reassembled from the bursts of the group bursts received so far.

In some examples, an expected starting location of the next burst of a group burst may be calculated by adding the defined Group Burst spacing to the starting location of the most recently received burst of the group burst. When the IDC receives an ASCMA burst, it may check the Start of Group Burst flag (SoGB) in the Group Burst Encapsulation (GBE) header of the burst to see if it may be the first burst of a new Group Burst. In an example, if it may be a new Group Burst and the Group Burst Remaining Size (GBRS) may be zero, then it may be assumed that it may be a single burst Group Burst and the IDC may immediately forwards the group burst to the IGM. In another example, if it may be a new Group Burst but the GBRS may be non-zero, the IDC may check to see if this burst has collided with an already in progress group burst.

The IDC may check the GBIP list to see if any in progress group burst's unique word and expected starting location match the new burst's unique word and starting location. If the new burst does not match to the in progress burst, the previously in progress burst may be aborted. In an example, aborting a Group Burst may involve forwarding the partially assembled Group Burst to the IGM marked as a partial Group Burst. Based on a collision check, the IDC may create a new entry for the new Group Burst in the GBIP list, while storing its GBRS value, Unique Word and calculated predicted starting location of the next burst of the Group Burst.

In some examples, if the SoGB flag may not be set, the IDC may attempt to match the new ASCMA burst to an in progress Group Burst. In an example, the IDC may look for an existing GBIP entry that has the same unique word as the current burst and has a predicted starting location as the starting location of the current burst (plus or minus one symbol). If no such GBIP entry may be found, the current burst may be discarded (with appropriate error statistics incremented). If a matching GBIP entry may be found, the GBRS value in the burst may be compared to the GBIP entry's GBRS to see if this burst may be the expected burst, where the new GBRS value ideally may be one less than the saved GBRS value. If the GBRS value may be correct, the payload of the new burst may be concatenated to the Group Burst being reassembled.

If the new GBRS value may be zero, the entire Group Burst may be assumed to be received and may be forwarded to the IGM of the gateway. Otherwise, the GBIP GBRS value and calculated next starting location may be updated. If the GBRS value in the new burst may not be the expected value, the new burst may be discarded. In some examples, the IDC scans the GBIP list looking for GBIP entries, periodically, for example at least once per (TDMA) frame). For any such GBIP entry found, the group burst may be aborted (with the partial Group Burst forwarded to the IGM). In some examples, the IDC may maintain certain statistics for the number of good, bad and missed ASCMA bursts as well as the number of complete and partial Group Bursts. In some examples, number of abandoned ASCMA bursts may also counted. This overall information may be passed to the IGM in the headers of the buffers which may be used to forward reassembled or partially reassembled Group Bursts to the IGM.

In some examples, ASCMA IBE packets may be handled by the IGM in a similar way that TDMA IBE packets may be handled. This may include decryption and IPE packet reassembly back into protocol data unit or PDUs. In some examples, the IGM may track ASCMA load according to the ASCMA rate control algorithm and may provide the required information to the terminals to keep the ASCMA error rate under control. In an example, the IDC may forward a partially received ASCMA Group Burst to the IGM, which the IGM may handle like IBE "packet" error. For the specific case of a partial ASCMA Group Burst, if the entire IBE header may be received, the IGM may process the contents of the IBE header as valid, including accepting any adaptation messages which may be included in the header.

The IGM may send the partial acknowledgement flag for the Group Burst in the SGBA to let the terminal know that only the header may be being acknowledged by the IGM. In some examples, when the entire IBE header may not be received, the IGM discards the Group Burst without acknowledging it all. Because each individual IPE packet may be protected, in theory, in addition to processing the IBE header, the IGM may also accept any IPE packets in the partial Group Burst, which have been completely received.

In some examples, ASCMA group bursts may be acknowledged by the IGM via the group burst acknowledgement message. However, as no apertures may be used with ASCMA, to enable indicating which group burst may be being acknowledged, a referencing of specific location may be included that may indicate the start of the group burst. However, this may represent a significant amount of overhead for each group burst acknowledgement. As a given terminal may only send one ASCMA burst at a time, the acknowledgment location may not be required to be precise. In some examples, to reduce the overhead required for the acknowledgement, the symbols within the TDMA frame may be divided into 64 zones with the zone number sent in the acknowledgement. If the terminal transmits a group burst starting in a particular zone, it may look for that zone in SGBA.

FIGS. 13A-13B illustrate examples 1300 and 1350 respectively for listing zone definitions, according to an example. As shown in FIG. 13A, the zone definitions may be listed for a 2048 ksps ASCMA, while in FIG. 13B, the zone definitions may be listed for a 4096 ksps ASCMA inroute. In some examples, ASCMA may also support the concept of a partial group burst acknowledgement, where receiving a partial group burst acknowledgement from the IGM may indicate that the IGM did not receive the entire group burst but did receive enough of the group burst to receive and process the entire Inroute Burst Encapsulation (IBE) header of the group burst. In an example, for a partially acknowledged group burst, the terminal may assume that the IGM may have received adaptation messages (for example, a MODCOD Request) sent in the Group Burst excluding the payload.

In an example, upon transmission of the encapsulated group burst from the terminal, the processor may analyze, based on an acknowledgement received by the terminal, a burst error rate pertaining to the ASCMA transmission for the selected inroute channel. The burst error rate may be a function of the number of terminals of the plurality of terminals that perform simultaneous ASCMA transmission of the encapsulated group burst packets. In an example, the burst error rate varies with an increasing value of a variable factor (lambda) that may increase based on an overlap between the encapsulated group burst packets of two separate ASCMA transmissions. In this case, the processor, through a congestion control algorithm (CCA), may facilitate congestion control of the ASCMA transmission based on a target BER value, wherein the target BER value corresponds to a pre-defined threshold limit of the variable factor. This may optimize the BER based on a crucial factor that may contribute to the BER (i.e. lambda). Therefore, by ensuring that lambda is within the pre-defined limit, the BER may be controlled efficiently. For example, the target BER may pertain to a value of 10-3, which may correspond to value of lambda as 11.

In an example embodiment, the information in the form of, for example, an operating probability (OP) may be sent to a terminal. The term operating probability may refer to scaling of a value based on which ASCMA transmission may be decided. For example, when the terminal may want to perform the ASCMA transmission, the terminal may decide, based on a random number, such that the random number may be compared to the operating probability that may be considered as a threshold value. In an example, if the operating probability is 100%, the terminal may perform the ASCMA transmission smoothly. In another example, if the operating probability is 90%, then, for 10% of the time, the terminal may not send the data via ASCMA transmission and may wait for another ASCMA transmit opportunity or for a TDMA transmit opportunity. In an example embodiment, the operating probability may be manipulated based on the estimated burst error rate (BER), such that if the BER is too high (beyond a threshold or more than target BER) then the value of operating probability may be lowered and if the BER is within a threshold, then the operating probability may be increased.

Figure 14A:
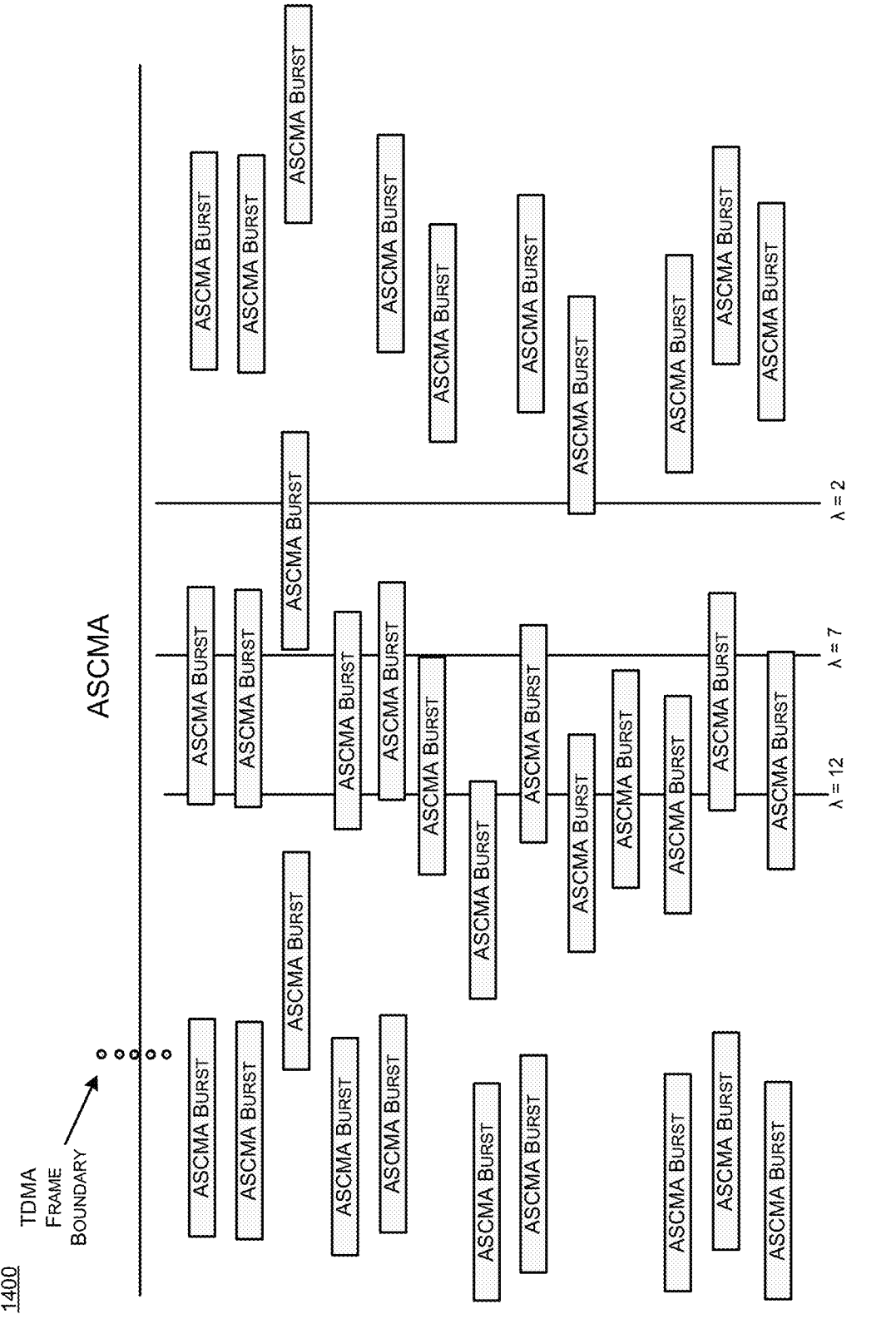
FIG. 14A illustrates an example for showing value of variable factor (lambda) for overlapping ASCMA bursts, according to an example.

FIG. 14A illustrates an example 1400 for showing value of variable factor (lambda) for overlapping ASCMA bursts, according to an example. As shown in FIG. 14A, as for ASCMA, there may be no apertures, the bursts may overlap for a small part of their duration. In some examples, the ASCMA hardware may be designed to support up to 20 bursts arriving in the same time as long as the average lambda (A) may be less than or equal to the pre-defined threshold limit such as, for example, lambda having a value of eleven. In an example embodiment, the term "lambda" may pertain to number of bursts, which may overlap and need to be cancelled out of each other. In an example, the value of lambda (such as lambda being eleven) may be based on a target ASCMA burst error rate of 10-3, i.e. no more than one in a thousand. In some examples, when the average lambda exceeds 11, the burst error rate may increase.

As shown in FIG. 14A, because of the asynchronous nature of the ASCMA transmission, the instantaneous lambda associated with a given ASCMA burst can vary over the duration of the burst. This may present a problem regarding measurement of lambda value. The ASCMA congestion control algorithm (CCA) may enable to control how much terminals use ASCMA to carry expedited data in order to keep the average lambda at or below the pre-defined threshold limit, such as, a value of 11. The CCA may enable adjusting the ASCMA usage based on the ASCMA burst error rate so as to control the value of the variable factor below the threshold limit.

In some examples, the CCA may control the ASCMA usage using a leaky bucket approach, where the congestion level (as indicated by the operating probability) may impact the rate at which tokens may be added to the bucket. The bucket may be termed as leaky because any token added to the bucket has a limited lifetime before it is "leaked" (i.e. removed) from the bucket. In an example, the CCA may enable an addition and removal of the tokens via a memory location (i.e. the "bucket") shared with ASCMA transmitter. This technique may include randomizing the addition of tokens to avoid artificially created a synchronization point across many terminals during congestion. In some examples, when there may be expedited data to be sent, the transmitter may only send it if there may be an available token to use. In an example, under extreme congestion conditions, the CCA may generate no tokens at all.

Figure 14B:
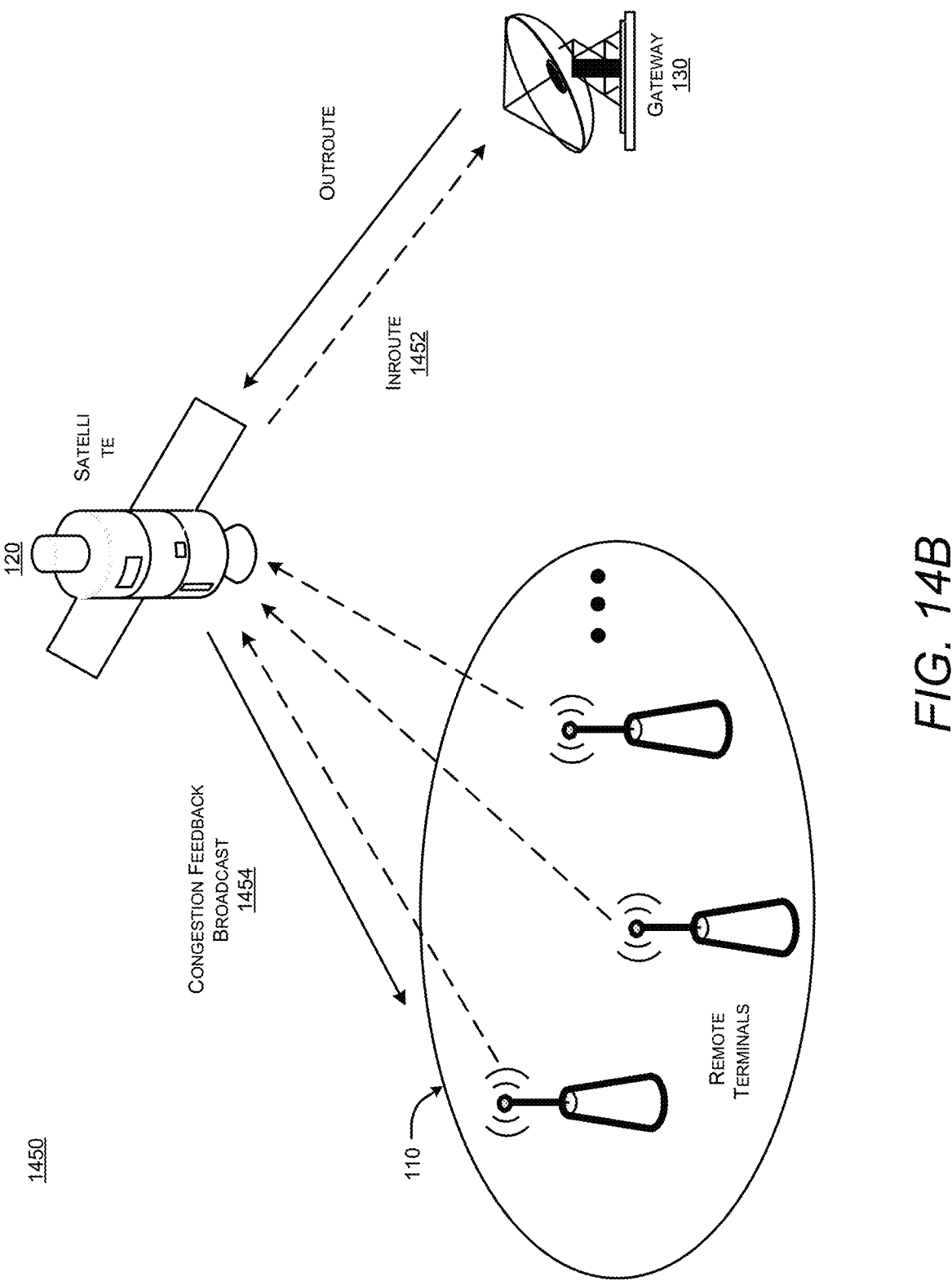
FIG. 14B illustrates an example for showing system model of plurality of terminals sharing a single ASCMA inroute channel, according to an example.

FIG. 14B illustrates an example 1450 for showing system model of plurality of terminals 110 sharing a single ASCMA inroute channel 1452, according to an example. As shown in FIG. 14B, the plurality of terminals 110 may utilize the ASCMA burst opportunities in the single ASCMA inroute channel 1452 transmitted to gateway 130. However, if the number of overlapped bursts from the multiple terminals may exceed a certain limit, some or all bursts may not be correctly decoded. An erroneous ASCMA burst may cause failure of a group burst, which may ultimately cause upper layer retransmission for a TCP packet. An excessive upper layer retransmission may not be efficient for a network of satellite 120.

Further, packet loss may also occur for non-TCP packets, which may carry critical control messages. In some examples, the system may avoid uncontrolled usage of an ASCMA channel, depending on frequent fluctuation of the network traffic. This may be applicable in even short momentary congestion that may cause many unsuccessful ASCMA bursts. In alternate examples, the usage of an ASCMA channel may be uncontrolled, particularly in case of large TCP packets, from Layer 3 to the ASCMA channel. In such scenarios, a feedback-based mechanism may be implemented to control the usage of ASCMA channel. In some examples, if the number of arrived ASCMA bursts exceeds a certain limit, the burst error rate may dramatically increase. The gateway 130 may regularly monitor the traffic and/or congestion and may notify the terminals to reduce the ASCMA usage in form of a congestion feedback broadcast 1454 sent to the terminals 110. This means that the terminal 110 may independently take autonomous action to optimize usage of ASCMA transmission based on the congestion notification received from the gateway 120.

The burst error rate due to the congestion may also be represented by the burst error probability in terms of number of overlaps and average received signal to noise ratio (Es/No) as shown in Table 5. In some examples, given a target Es/No, the burst error rate (BurstER) may increase with the number of overlaps. For example, when the number of overlaps may be 15, all received bursts may be in a collapsed state regardless of the Es/No. In some examples, the burst error rate or BurstER may be also dependent on the received Es/No. For example, when the number of overlaps may be 7, the BurstER may be 1.1E-2 and 1.4E-4 for average Es/No 0 dB and 2 dB, respectively. In general, an average target Es/No for ASCMA may represent random values within the range of the target Es/No+/−2 dB.

In some examples, during congestion time, it may be critical to control the usage of ASCMA channel to avoid excessive burst error rate.

TABLE 5

| ASCMA Burst Error Probability | | | | |
|---|---|---|---|---|
| Overlapped | Burst error rate for Target signal to noise ratio (Es/No) | | | |
| users or terminals | 0 (dB) | 1(dB) | 2(dB) | 3(dB) |
| 2 | 0.003993 | 0.000189 | 1.11E−05 | 3.25E−06 |
| 3 | 0.005344 | 0.000304 | 3.47E−05 | 1.68E−05 |
| 4 | 0.006598 | 0.000429 | 6.67E−05 | 4.10E−05 |
| 5 | 0.007187 | 0.000573 | 9.01E−05 | 5.26E−05 |
| 6 | 0.009072 | 0.000704 | 0.000113 | 8.09E−05 |
| 7 | 0.011006 | 0.000934 | 0.000141 | 8.85E−05 |
| 8 | 0.012877 | 0.001244 | 0.000185 | 0.000109 |
| 9 | 0.017153 | 0.001597 | 0.000242 | 0.00013 |
| 10 | 0.019675 | 0.001956 | 0.000304 | 0.000153 |
| 11 | 0.024368 | 0.002904 | 0.000425 | 0.000146 |
| 12 | 0.027441 | 0.003388 | 0.000719 | 0.000266 |
| 13 | 0.050359 | 0.005358 | 0.001188 | 0.000611 |
| 14 | 1 | 0.840336 | 0.541005 | 0.200985 |
| 15 | 1 | 1 | 1 | 1 |

In some examples, based on a location of a burst or a burst opportunity, each terminal or burst may utilize corresponding unique words such that by identifying the unique words, the number of overlapped bursts may be determined. As the missed or false detection rate for unique words may be sufficiently small (for example, less than 1 E-4), it may be assumed that the number of received bursts at a burst location (opportunity) can be determined by the identified unique words. Upon detection of a burst, it may or may not be successfully decoded and hence the number of successfully decoded bursts may be equal to or less than the number of detected bursts. Therefore, it may be considered that number of detected bursts and the number of successfully decoded bursts, for example, at 45 ms frame, may be known to the physical layer and can be conveyed to the link layer. As a result, the IGM may be able to calculate the burst error rate based on the number of detected bursts and the number of successfully decoded bursts.

In an example, considering a reasonably light congestion case, where each burst opportunity may have average overlap of 6 to 7 bursts, the BurstER may be 1 E-2 to 1 E-4 for target Es/No of 0 dB to 2 dB (as shown in Table 5). In this case, each frame would have 6*25=150 bursts, which means that 8 frames may include 1200 bursts and 16 frames may include 2400 bursts. This indicates that 16 frames may be sufficient for collecting information pertaining to burst error rate or BurstER.

Assuming $T_W$ may represent the window size to calculate BurstER, at any time t (unit: frame), burst error rate may be calculated as:

$$BurstER(t) = \frac{N_{det} - N_{suc}}{N_{det}}, N_{det} \neq 0.$$

where $N_{det}$ and $N_{suc}$ may represent the number of detected and the number of successfully decoded bursts in past $T_W$ frames.

In some examples, when no burst may be detected, it may be due to reasons such as: no bursts being transmitted, too many bursts arriving, and/or component failure. If too many bursts collapse, a terminal may responsively reduce using or turn off ASCMA transmission. Thus it may be reasonable to carry over the BurstER from previous frame, i.e., If $N_{det}$=0,then BurstER($t$)=BurstER($t$−1).

In some examples, if the IGM receives less than "M" ASCMA bursts in one updating period, the IGM uses the calculated BurstER in the previous updating period.

In some examples, if the IGM receives less than "M" SCMA bursts in one updating period for K consecutive updating periods (where K may represent the time-out value), the IGM may reset BurstER to zero and may not carry the previous value. In this scenario, the updating period may be configured as 16 frames.

Based on configuration of the IGM, for example, if M=50 (or 30) bursts, then K=4 periods. This means if the IGM receives less than 50 bursts per superframe for 4 consecutive superframes (or 50 bursts per period for 4 consecutive periods), the IGM may reset BurstER to zero until sufficient burst samples arrive.

In some examples, a long term burst error rate may be calculated, where long term burst error rate may be denoted as $BurstER_{LT}(t)$. The sampling time may be multiple flow control period. In this case, $K_{LT}$ may be the number of periods to collect $BurstER_{LT}(t)$, which may be derived as:

$$BurstER_{LT}(t) = \frac{N_{det,LT} - N_{suc,LT}}{N_{dec,LT}}, N_{det,LT} \neq 0.$$

where, if $N_{det,LT} \leq M_{LT}, BurstER_{LT}(t) = 0.$ where $N_{det,LT}$ and $N_{suc,LT}$ may represent the detected and successful number of ASCMA bursts in $K_{LT}$ periods, respectively. In above, $K_{LT}$ and $M_{LT}$ may represent as advanced configuration parameters with default values $K_{LT}$=10 and $M_{LT}$=500. From this, it may be derived that long term BurstER may evaluated every 160 frames (7.2 seconds) and if $K_{LT}$=1, then $$BurstER_{LT}(t)=BurstER(t).$$

The BurstER sent to the terminals by the IGM, $\mathrm{BurstER}^*_{LT}$, may represent either the short term or long term BurstER, whichever may be smaller, i.e., $$\mathrm{BurstER}^*_{LT}(t)=\min[\mathrm{BurstER}^*_{LT}(t),\mathrm{BurstER}(t)].$$

where $\mathrm{BurstER}^*_{LT}$ may be sent to terminals every 16 frames such that terminal may use $\mathrm{BurstER}^*_{LT}$ to determine the enqueuing and other associated functions.

In normal conditions, it may be considered that both of the missed detection and false detection rates may be significantly small compared to the targeted burst error rate (for example, the targeted BurstER=1E−3). However, there may be two scenarios in which the measured BurstER may be wrong, such as, for example, in case of abandoned bursts and the second may be memory overflow due to lack of processing capability or memory size. In case of abandoned bursts, if an identified burst in group burst may be decoded as an erroneous one, the remaining bursts in the same group burst may be abandoned as it may be assumed that it may be futile to decode the remaining bursts.

In general, the abandoned bursts may form a portion of the total sample set and may follow the same burst error probability. However, if this portion of sample set may be too large compared to those used for collection BurstER statistics, then the measured BurstER may lose accuracy. In such cases, the GBE header may improve the error calculation. In case of the memory overflow, the received bursts may drop in the event of memory overflow, which may impact the accuracy of burst error rate. These two scenarios leading to reduced accuracy in the measurement of BurstER may be handled by a feedback based mechanism for congestion control.

In an example, the feedback-based mechanism to control the burst error rate of ASCMA may be based on the concept of congestion control. In some examples, assuming that BurstER may be low, a transmission opportunity may be scaled up such that more bursts can be transmitted. In some examples, when the BurstER may be high, the transmission opportunity may be scaled down. The measure of scaling up or down can be an integer or a fraction (referred to as a scaling factor or operating probability). In an example, based on an integer value, the IGM increases or decreases the effective number of transmission opportunities by comparing the BurstER to a pre-set target BurstER, where the IGM sends the integer to the terminals. For example, scaling factor or operating probability may have a value between 0 and 1 such that the scaling factor may be increased or decreased based on the instant BurstER compared to the target BurstER.

The IGM may send the operating probability (also interchangeably referred to as the scaling factor) to the terminals (110) as the congestion feedback broadcast (1454) (as shown in FIG. 14B). Upon receiving the scaling factor, the terminals 110 may apply the scaling factor to influence probability of using ASCMA burst opportunity (scaling factor may also be referred to as operating probability). In some examples, the scaling factor may be important as the scaling factor may have better granularity and/or because using a probability may include better randomness.

Assuming $K(t_{LP})$ as the number of detected bursts and $K_{Opt}$ be an operating threshold for the minimum number of detected bursts received in period $T_{LP}$, respectively, the moving average of $K(t_{LP})$ can be expressed as $$K_{EMA}(t_{LP})=a_{LP} \cdot K(t_{LP})+(1-a_{LP}) \cdot K_{EMA}(t_{LP}-1),$$

where $\psi_{Tar}$ may represent the target BurstER, $P_{Opt}$ may represent the Operating Probability, $\Delta$ may represent the step size, $\delta$ may represent the tolerance range, $T_{LP}$ may represent the loop period of congestion control and $t_{LP}$ may represent time tick (unit: $T_{LP}$) for the congestion control loop.

$$\text{If } t_{LP}=1, K_{EMA}(t_{LP})=K(t_{LP})$$

The default value for the advanced configurable smoothing factor may be $a_{LP}=0.1$.
Based on this, if $K_{EMA}(t_{LP}) \leq K_{Opt}$ $$P_{Opt}(t_{LP})=\min[P_{Opt}(t_{LP}-1)^*(1+\Delta),P_{Opt,max}]$$

Else if $$\mathrm{BurstER}(t_{LP})<\psi_{Tar}(1-\delta),$$

$$P_{Opt}(t_{LP})=\min[P_{Opt}(t_{LP}-1)^*(1+\Delta),P_{Opt,max}];$$

$$\text{If } \mathrm{BurstER}(t_{LP})>\psi_{Tar}(1+\delta),$$

$$P_{Opt}(t_{LP})=\max[P_{Opt}(t_{LP}-1)(1-\Delta),P_{Opt,min}],$$

$$\text{If } \psi_{Tar}(1-\delta) \leq \mathrm{BurstER}(t_{LP}) \leq \psi_{Tar}(1+\delta),$$

$$P_{Opt}(t_{LP})=P_{Opt}(t_{LP}-1),$$

where $P_{Opt,max}$ and $P_{Opt,min}$ may represent configurable maximum and minimum values of the operating probability.

In some examples, the default values may be $P_{Opt,max}=1$ and $P_{Opt,min}=01$, respectively. In an example, the initial value $P_{Opt}(t_{LP})=P_{Opt,max}$; default value for the congestion loop delay may be $T_{LP}=16$ frames, the step size may include default value of $\Delta=0.10$, the target burst error rate may be set as $\psi_{Tar}=1$ E−3, the burst error rate tolerance may be set as $\delta=0.15$ to 0.20, and the granularity of the operating probability may be rounded to 0.01.

In some examples, the setting of $K_{Opt}$ may be to ensure the ASCMA channel to take sufficient traffic given the possibility of roughness in burst error rate due to varying IC (Interference Correction) values, inaccuracy in open and closed power control on ASCMA. $K_{Opt}$ may be an Advance configuration variable with default value $K_{Opt}=1200$, which may be equivalent to about 1.3 Mbps throughput. In some examples, in every congestion control period, the IGM may send ASCMA control metrics as the congestion feedback broadcast to the terminals 110. In an example, the ASCMA control metrics may include the most recent burst error rate (BurstER) and the operating probability such that the terminal may immediately act based on the ASCMA control metrics when it becomes active.

FIG. 15 illustrates a method 1500 for facilitating inroute transmission of data, according to an example. In an example, the inroute transmission may pertain to transmission from a plurality of terminals to a gateway. The method 1500 may be provided by way of example, as there may be a variety of ways to carry out the method described herein. Although the method 1500 may be primarily described as being performed by the system 100 of FIG. 1, the method 1500 may be executed or otherwise performed by one or more processing components of another system or a combination of systems. Each block shown in FIG. 15 may further represent one or more processes, methods, or subroutines, and one or more of the blocks may include machine readable instructions stored on a non-transitory computer readable medium and executed by a processor or other type of processing circuit to perform one or more operations described herein.

At 1502, the method may include receiving, by a processor, information pertaining to a bandwidth capacity of a communication channel for an inroute transmission of data. The inroute transmission of data may be from a terminal of a plurality of terminals. At 1504, the method may include determining, by the processor, based on the bandwidth capacity and using an asynchronous scrambled coded multiple access (ASCMA) technique, a bandwidth allocation to be applied for facilitating the inroute transmission of data. In some examples, the inroute transmission of data may be in the form of ASCMA transmission of plurality of encapsulated group burst packets that may be transmitted without time based scheduling to optimize the bandwidth capacity.

In some examples, the method may, at step 1506, include facilitating, by the processor, an advertisement of multiple inroute sets available to a terminal for the ASCMA transmission. The method may, at step 1508, further include selecting a first inroute set from the multiple inroute sets for the ASCMA transmission of the plurality of encapsulated group burst packets. In an example, the inroute set may be selected based on a weighted random selection depending on corresponding load condition and availability of the selected inroute set at the time of the selection. At step 1510, the method may include transmitting, based on the determined bandwidth allocation, using the first inroute set, data in the form of ASCMA transmission of the one or more encapsulated group burst packets to optimize the bandwidth capacity.

In some examples, the method may, at step 1512, include facilitating, through a congestion control algorithm (CCA), a congestion control of the ASCMA transmission based on a target BER value, wherein the target BER value corresponds to a pre-defined threshold limit of the variable factor. This may enable to optimize the BER based on a crucial factor that may contribute to the BER (i.e., lambda). Therefore, by ensuring that lambda is within the pre-defined limit, the BER may be controlled efficiently.

Figure 16:
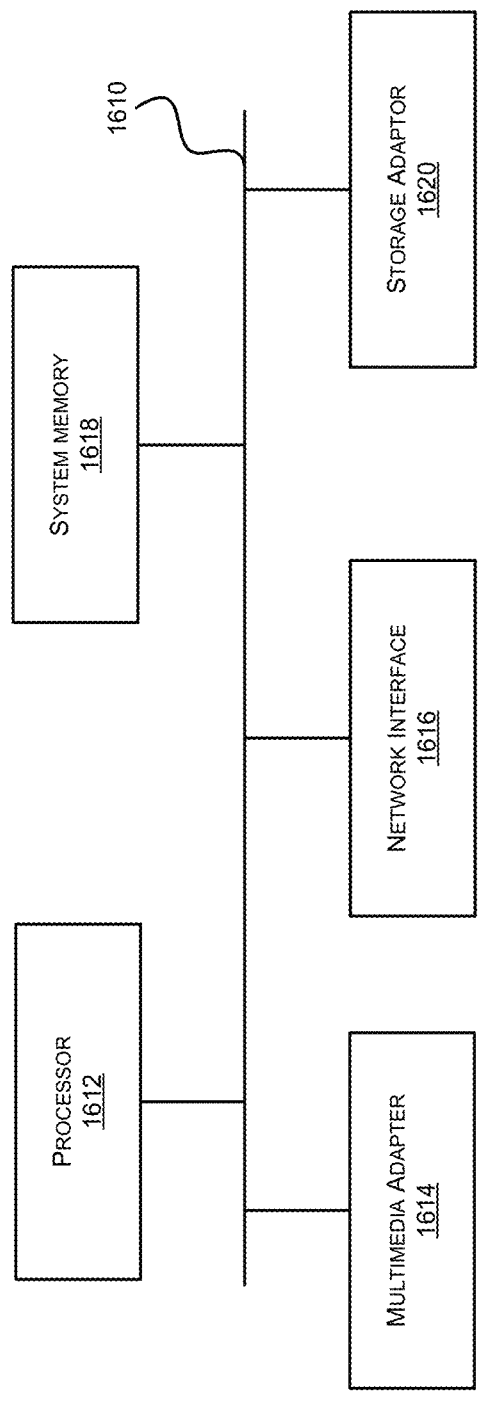
FIG. 16 illustrates a block diagram of a computer system for facilitating inroute transmission of data, according to an example.

FIG. 16 illustrates a block diagram of a computer system 1600 for facilitating inroute transmission of data, according to an example. The computer system 1600 may be part of or any one of the terminals 110, the gateway 130, the network data center 140, the network management system (NMS) 150, the business system 160, as shown in system 100 to perform the functions and features described herein. The computer system 1600 may include, among other things, an interconnect 1610, a processor 1612, a multimedia adapter 1614, a network interface 1616, a system memory 1618, and a storage adapter 1620.

The interconnect 1610 may interconnect various subsystems, elements, and/or components of the computer system 1600. As shown, the interconnect 1610 may be an abstraction that may represent any one or more separate physical buses, point-to-point connections, or both, connected by appropriate bridges, adapters, or controllers. In some examples, the interconnect 1610 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 1610 may allow data communication between the processor 1612 and system memory 1618, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS), which controls basic hardware operation such as the interaction with one or more peripheral components.

The processor 1612 may be the central processing unit (CPU) of the computing device and may control overall operation of the computing device. In some examples, the processor 1612 may accomplish this by executing software or firmware stored in system memory 1618 or other data via the storage adapter 1620. The processor 1612 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 1614 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 1616 may provide the computing device with an ability to communicate with a variety of remove devices over a network (e.g., private network 170 or public network 180 of FIG. 1) and may include, for example, an Ethernet adapter, a Fiber Channel adapter, and/or other wired- or wireless-enabled adapter. The network interface 1616 may provide a direct or indirect connection from one network element to another, and facilitate communication and between various network elements. In an aspect, the feature of transmission of the data can either be undertaken by the instant computer/computing device and/or by a separate transmitter such as a RF/satellite interface that is operatively/communicatively coupled with the network interface 1616. Any other possible configuration based on which the steps and actions of the systems and methods of the present disclosure can be carried out are well within the scope of the present disclosure. The device can be a single computing device capable of undertaking all the actions until the data is transmitted or can be a set of devices that are operatively/communicatively coupled with each other.

The storage adapter 1620 may connect to a standard computer-readable medium for storage and/or retrieval of information, such as a fixed disk drive (internal or external).

Many other devices, components, elements, or subsystems (not shown) may be connected in a similar manner to the interconnect 1610 or via a network (e.g., private network 170 or public network 180 of FIG. 1). Conversely, all of the devices shown in FIG. 16 need not be present to practice the systems and methods described herein. The devices and subsystems can be interconnected in different ways from that shown in FIG. 16. Code or computer-readable instructions to implement the dynamic approaches for payment gateway selection and payment transaction processing of the system 1600 may be stored in computer-readable storage media such as one or more of system memory 1618 or other storage. Code or computer-readable instructions to implement the dynamic approaches for payment gateway selection and payment transaction processing of the system 1600 may also be received via one or more interfaces and stored in memory. The operating system provided on computer system 1600 may be MS-DOS®, MS-WINDOWS®, OS/2®, OS X®, IOS®, ANDROID®, UNIX®, Linux®, or another operating system.

As mentioned above, what may be shown and described with respect to the systems and methods above may be illustrative. While examples described herein may be directed to configurations as shown, it should be appreciated that any of the components described or mentioned herein may be altered, changed, replaced, or modified, in size, shape, and numbers, or material, depending on application or use case, and adjusted for the inroute transmission in satellite communication systems.

It should be appreciated that the systems and methods described herein may facilitate to enhance link performance in satellite systems. It should also be appreciated that the systems and methods, as described herein, may also include or communicate with other components not shown. For example, these may include external processors, counters, analyzers, computing devices, and other measuring devices or systems.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components, or network elements via a network or other communication protocol.

Although examples may be directed to satellite communication systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

By leveraging existing customer terminals, the system and methods described herein may provide efficient processing techniques and a cost-effective approach that may be readily integrated into various and existing network equipment. The systems and methods described herein may provide mechanical simplicity and adaptability to small or large satellite communication systems. Ultimately, the systems and methods described herein may increase efficiency, reduce cost, maximize existing equipment, minimize adverse effects of traditional systems, and improve inroute transmission performance.

What has been described and illustrated herein may be examples of the systems and methods along with some variations. The terms, descriptions, and figures used herein may be set forth by way of illustration only and may not be meant as limitations. Many variations may be possible within the scope of the systems and methods described herein, which may be intended to be defined by the following claims—and their equivalents—in which all terms may be meant in their broadest reasonable sense unless otherwise indicated.

The invention claimed is:

1. A system, comprising:
   a processor; and
   a memory storing instructions, which when executed by the processor, cause the processor to:
      receive information pertaining to bandwidth capacity of a communication channel for inroute transmission of data from a terminal of a plurality of terminals;
      determine, based on the received information and using an asynchronous scrambled coded multiple access (ASCMA) technique, bandwidth allocation for inroute transmission of data in the form of ASCMA transmission of one or more encapsulated group burst packets, wherein the ASCMA technique uses a Quadrature Phase Shift Keying (QPSK) modulation, and wherein the processor facilitates advertisement of multiple inroute sets available to the plurality of terminals for the ASCMA transmission; and
      transmit, based on the determined bandwidth allocation, data in the form of ASCMA transmission of the one or more encapsulated group burst packets to optimize the bandwidth capacity.

2. The system of claim 1, wherein the one or more encapsulated group burst packets pertain to encoded transmission of information in the form of multiple packets, each packet having a burst size and pre-defined spacing there between, and wherein the processor determines at least one of the burst size or the pre-defined spacing to prevent a collision between packets pertaining to two separate groups.

3. The system of claim 1, wherein to determine the bandwidth allocation, the processor selects a first inroute set from the multiple inroute sets for the ASCMA transmission of the plurality of encapsulated group burst packets, wherein the inroute set is selected based on a weighted random selection depending on a corresponding load condition and availability of the selected inroute set at the time of the selection.

4. The system of claim 3, wherein the processor facilitates monitoring of the multiple inroute sets at pre-defined time intervals, and wherein based on the monitoring and a configurable parameter, a second inroute set is re-selected from the multiple inroute sets such that the second inroute set is less congested than the first inroute set.

5. The system of claim 1, wherein each packet in the one or more encapsulated group burst packets comprises a corresponding header and a unique word identifier, wherein the unique word identifier is randomly selected by the terminal and comprises a single set of a 512-symbol based unique word, and wherein the unique word identifier enables identification of the encapsulated group burst packets pertaining to a common group.

6. The system of claim 1, wherein the processor facilitates enqueuing and dequeuing of the one or more encapsulated group burst packets to optimize a packet loss rate within a pre-defined threshold.

7. The system of claim 1, wherein the processor facilitates randomization of the ASCMA transmission received from two separate terminals to enable recognition of the one or more encapsulated group burst packets pertaining to two different groups.

8. The system of claim 1, wherein the processor identifies a minimum transmit opportunity spacing between two consecutive ASCMA transmissions for reducing latency in the transmission of the two consecutive ASCMA transmissions.

9. The system of claim 1, wherein the processor evaluates scheduling frames corresponding to Time-division multiple access (TDMA) allocation for identification of a transmission opportunity window for the ASCMA transmission.

10. The system of claim 9, wherein the processor facilitates the ASCMA transmission of at least one of a system control information or an expedited user data to minimize corresponding latency, and wherein the ASCMA transmission of the expedited user data is performed based on a token pertaining to a transmit token bucket.

11. The system of claim 10, wherein the expedited user data is transmitted as the one or more encapsulated group burst packets in accordance with a size requirement pertaining to at least one of a size required to send an expedited packet, a maximum size of a encapsulated group burst packet fitting the available transmit opportunity window, or a maximum size of the encapsulated group burst packet allowed by the terminal configuration.

12. The system of claim 1, wherein upon transmission of the encapsulated group burst from the terminal, the processor analyzes, based on an acknowledgement received by the terminal, a burst error rate (BER) pertaining to the ASCMA transmission for the selected inroute channel, and wherein the acknowledgement pertains to at least one of partial receipt, non-receipt, or complete receipt of the encapsulated group burst packets.

13. The system of claim 12, wherein the burst error rate is a function of the number of terminals of the plurality of terminals that perform simultaneous ASCMA transmission of the encapsulated group burst packets.

14. The system of claim 13, wherein the burst error rate varies with an increasing value of a variable factor that increases based on an overlap between the encapsulated group burst packets of two separate ASCMA transmissions.

15. The system of claim 14, wherein the processor, through a congestion control algorithm (CCA), facilitates congestion control of the ASCMA transmission based on a target BER value, wherein the target BER value corresponds to a pre-defined threshold limit of the variable factor.

16. A method for facilitating inroute transmission of data, comprising:

receiving, by a processor, information pertaining to a bandwidth capacity of a communication channel for an inroute transmission of data from a terminal of a plurality of terminals;

determining, by the processor, based on the received information and using an asynchronous scrambled coded multiple access (ASCMA) technique, bandwidth allocation for inroute transmission of data in the form of ASCMA transmission of one or more encapsulated group burst packets, wherein the ASCMA technique uses a Quadrature Phase Shift Keying (QPSK) modulation, and wherein the processor facilitates advertisement of multiple inroute sets available to the plurality of terminals for the ASCMA transmission; and transmitting, based on the determined bandwidth allocation, data in the form of ASCMA transmission of the one or more encapsulated group burst packets to optimize the bandwidth capacity.

17. The method of claim 16, wherein the method comprises:

selecting, by the processor, a first inroute set from the multiple inroute sets for the ASCMA transmission of the one or more encapsulated group burst packets, wherein the inroute set is selected based on a weighted random selection depending on a corresponding load condition and availability of the selected inroute set at the time of the selection.

18. The method of claim 16, wherein the method comprises facilitating, by the processor, through a congestion control algorithm (CCA), a congestion control of the ASCMA transmission based on a target BER value, wherein the target BER value corresponds to a pre-defined threshold limit of a variable factor.

19. A non-transitory computer-readable storage medium having an executable stored thereon, which, when executed, instructs a processor to perform a method as follows:

receive information pertaining to a bandwidth capacity of a communication channel for an inroute transmission of data from a terminal of a plurality of terminals;

determine based on the received information and using an asynchronous scrambled coded multiple access (ASCMA) technique, a bandwidth allocation for inroute transmission of data in the form of ASCMA transmission of one or more encapsulated group burst packets, wherein the ASCMA technique uses a Quadrature Phase Shift Keying (QPSK) modulation, and wherein the processor facilitates advertisement of multiple inroute sets available to the plurality of terminals for the ASCMA transmission; and transmit, based on the determined bandwidth allocation, data in the form of ASCMA transmission of the one or more encapsulated group burst packets to optimize the bandwidth capacity.

* * * * *